(12) United States Patent
Garvey

(10) Patent No.: US 8,271,421 B1
(45) Date of Patent: Sep. 18, 2012

(54) NONPARAMETRIC FUZZY INFERENCE SYSTEM AND METHOD

(75) Inventor: Dustin R. Garvey, Celle (DE)

(73) Assignee: Intellectual Assets LLC, Lake Tahoe, NV (US)

( * ) Notice: Subject to any disclaimer, the term of this patent is extended or adjusted under 35 U.S.C. 154(b) by 850 days.

(21) Appl. No.: 12/315,137

(22) Filed: Nov. 28, 2008

Related U.S. Application Data

(60) Provisional application No. 61/004,839, filed on Nov. 30, 2007, provisional application No. 61/005,057, filed on Nov. 30, 2007.

(51) Int. Cl.
*G06F 9/44* (2006.01)
*G06N 7/02* (2006.01)
*G06N 7/06* (2006.01)

(52) U.S. Cl. .................................................. 706/52
(58) Field of Classification Search ................. None
See application file for complete search history.

(56) References Cited

U.S. PATENT DOCUMENTS

2005/0065753 A1 * 3/2005 Bigus et al. .................. 702/186
* cited by examiner

*Primary Examiner* — Omar Fernandez Rivas
*Assistant Examiner* — Luis Sitiriche
(74) *Attorney, Agent, or Firm* — Dennis A. DeBoo

(57) ABSTRACT

Nonparametric fuzzy inference system and method used in combination with a computer and memory for providing an indicator of asset condition by collecting asset training data, creating membership functions by deriving parameters of the membership functions directly from the asset training data, acquiring current asset data, and using the membership functions in a fuzzy inference system for processing the current asset data for providing an indicator of asset condition.

45 Claims, 18 Drawing Sheets

| | Half Width (Δ) | Right Leg |
|---|---|---|
| $X_{4,j}$ | $X_{4-2,j} - X_{4,j} = X_{2,j} - X_{4,j}$ | $X_{4,j} + \Delta$ |
| $X_{5,j}$ | $X_{5-2,j} - X_{5,j} = X_{3,j} - X_{5,j}$ | $X_{5,j} + \Delta$ |

| Predictor | Number Detected | Detection Rate | Warning Time (hrs) |
|---|---|---|---|
| NFIS | 10 | 91% | 19.70 |
| AAKR | 10 | 91% | 21.97 |
FIG. 19
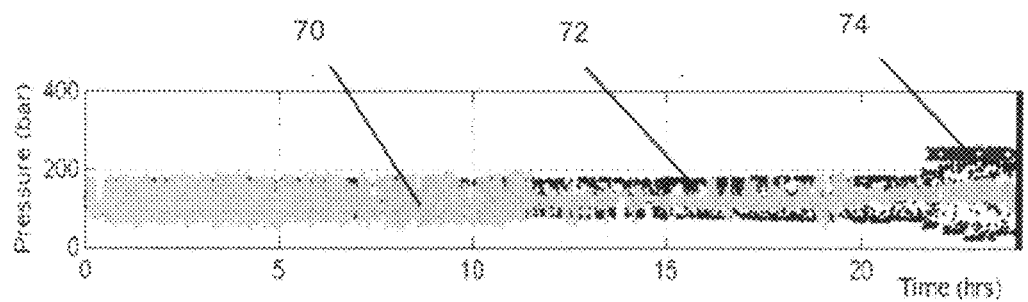
FIG. 20A
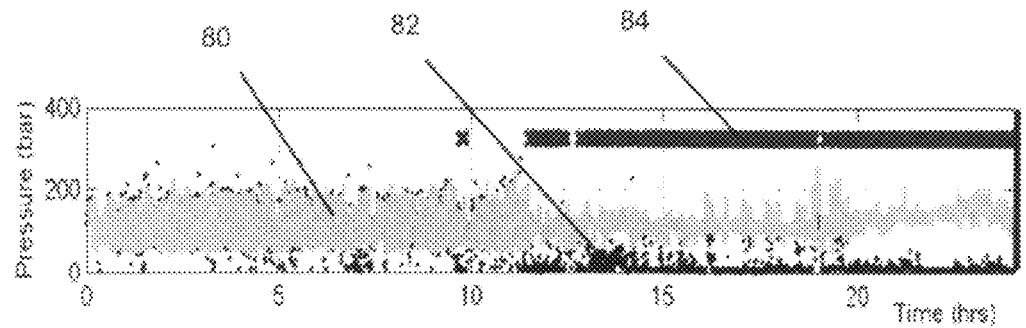
FIG. 20B

|  |  | Predicted Class | | | Class Accuracy (%) | Overall Accuracy (%) |
|---|---|---|---|---|---|---|
|  |  | MI | PTO | PS | | |
| True Class | MI | 2087 | 44 | 128 | 92.39 | 93.62 |
| | PTO | 152 | 7350 | 117 | 96.47 | |
| | PS | 211 | 24 | 490 | 67.59 | |

FIG. 21

|  |  | Predicted Class | | | Class Accuracy (%) | Overall Accuracy (%) |
|---|---|---|---|---|---|---|
|  |  | MI | PTO | PS | | |
| True Class | MI | 1616 | 19 | 24 | 97.41 | 88.14 |
| | PTO | 217 | 7076 | 43 | 96.46 | |
| | PS | 632 | 325 | 670 | 41.18 | |

FIG. 22

| Fault | Mean Lifetime after OTF (hrs) | Mean RUL Estimate after OTF (hrs) | MAE (hrs) | MAE (%) |
|---|---|---|---|---|
| MI | 3.36 | 4.00 | 0.64 | 19.05 |
| PTO | 2.81 | 1.94 | 0.87 | 30.96 |
| PS | 9.82 | 14.19 | 4.37 | 44.45 |

FIG. 23

```
┌─────────────────────────────────────────────────────────────────────┐
│ A computer implemented method for determining an indicator correlative to a │
│ condition of an asset, comprising the steps of:                     │
└─────────────────────────────────────────────────────────────────────┘
                                    │
┌─────────────────────────────────────────────────────────────────────┐
│ Obtaining data correlative to operation of an asset;                │
└─────────────────────────────────────────────────────────────────────┘
                                    │
┌─────────────────────────────────────────────────────────────────────┐
│ Creating membership functions using the obtained data;              │
└─────────────────────────────────────────────────────────────────────┘
                                    │
┌─────────────────────────────────────────────────────────────────────┐
│ Acquiring current asset data from the asset; and                    │
└─────────────────────────────────────────────────────────────────────┘
                                    │
┌─────────────────────────────────────────────────────────────────────┐
│ Utilizing the membership functions and the current asset data for evaluating │
│ antecedents and consequents of conditionals for determining an indicator │
│ correlative to a condition of the asset.                            │
└─────────────────────────────────────────────────────────────────────┘
```

FIG. 27

A computer implemented method for determining an indicator of asset condition, comprising the steps of:

Obtaining data correlative to operation of an asset;

Creating input membership functions and output membership functions using the obtained data;

Acquiring current asset data from the asset;

Utilizing the input membership functions and the current asset data for evaluating antecedents of conditionals and degree of fulfillments of the antecedents;

Utilizing the output membership functions and the degree of fulfillments of the antecedents for evaluating consequents of the conditionals; and Utilizing the consequents of the conditionals for determining an indicator of asset condition.

FIG. 28

NONPARAMETRIC FUZZY INFERENCE SYSTEM AND METHOD

CROSS-REFERENCE TO RELATED APPLICATIONS

This application claims priority under 35 USC Section 119(e) to co-pending U.S. Provisional Patent Application No. 61/004,839, filed Nov. 30, 2007, the entire disclosure of which is incorporated herein by reference.

This application is also related to U.S. Provisional Patent Application No. 61/005,057, filed Nov. 30, 2007, entitled "Path Classification and Estimation Method and System for Prognosticating Asset Life," the entire disclosure of which is incorporated herein by reference.

FIELD OF THE INVENTION

This invention relates generally to nonparametric fuzzy inference systems and methods, and in particular, to a nonparametric fuzzy inference system and method for providing an indicator of asset condition.

BACKGROUND OF THE INVENTION

Currently, fuzzy logic has been combined successfully with many different analysis procedures, most notably with neural networks in the form of the adaptive neuro-fuzzy inference system. In one approach, a method was developed to use composed observations to parameterize membership functions (MF) of a fuzzy inference system (FIS). For example, it is known to use expert knowledge to create membership functions about composed patterns that map to qualitative features such as hot, cold, high, low, etc. In another approach, it is known to partition membership function parameterization. In fuzzy partitioning, the data space is partitioned into regions and membership functions are created about the centers of these regions. A similar approach is also known and implemented in unsupervised clustering algorithms, such as fuzzy c-means and clustering, which centers the membership functions on composed cluster centers and calculates the cluster parameters in terms of the distance from the cluster center. In yet another known approach, the parameters of the membership functions can be determined by performing least squares optimization of the fuzzy inference system inputs and outputs.

Finally, another known approach proposed a fuzzy instance model (FIM) which centers membership functions on exemplar observations and requires the membership function parameter(s) to be optimized according to some objective function.

Hence, there is a need to pioneer a new inference method and system by building it from the ground up instead of incrementally innovating on prior inference technologies. Additionally, there is a need for a method and system that ameliorates or overcomes one or more of the shortcomings of the known prior art.

BRIEF SUMMARY OF THE INVENTION

Accordingly, an embodiment of the instant invention provides a nonparametric fuzzy inference system and method that derives parameters of membership functions directly from observations for allowing the nonparametric fuzzy inference system and method to be fully defined by the data and not by the prior art method of some objective function. Thus, an embodiment of the instant invention provides a nonparametric fuzzy inference system and method whose membership parameters are defined by exemplar observations directly as opposed to the prior art method of using composed observations. Additionally, an embodiment of the instant invention provides a nonparametric fuzzy inference system and method whose membership function centers and parameters are observations of exemplar inputs and outputs. This is in stark contrast to the known prior art approach of using composed observations to parameterize the membership functions in a fuzzy inference system.

Accordingly, an embodiment of the instant invention provides a unique approach for facilitating the expansion of inference procedures into new areas of commercialization and research. Additionally, an embodiment of the instant invention provides a nonparametric fuzzy inference system and method which fuses the benefits of fuzzy logic (i.e. effectively manage uncertain or corrupted inputs, natural linguistic structure, etc.) with nonparametric techniques (i.e. defined by data, small training times, etc.).

Moreover, research results in the field of asset surveillance indicate that embodiments of the instant invention provide a nonparametric fuzzy inference system and method that produces superior sensitivities and accuracies as compared to traditional techniques such as autoassociative kernel regression (AAKR) and k-nearest neighbor (kNN) pattern classification.

In one aspect, an embodiment of the invention provides a computer implemented method for determining an indicator correlative to a condition of an asset, comprising the steps of: obtaining data correlative to operation of an asset; creating membership functions using the obtained data; acquiring current asset data from the asset; and utilizing the membership functions and the current asset data for evaluating antecedents and consequents of conditionals for determining an indicator correlative to a condition of the asset. Additionally, an embodiment of the invention provides a computer-readable medium having computer executable instructions recorded thereon which causes, in use, a computer running the instructions to execute a procedure according to the above computer-implemented method.

In another aspect, an embodiment of the invention provides a computer implemented method for determining an indicator of asset condition, comprising the steps of: obtaining data correlative to operation of an asset; creating input membership functions and output membership functions using the obtained data; acquiring current asset data from the asset; utilizing the input membership functions and the current asset data for evaluating antecedents of conditionals and degree of fulfillments of the antecedents; utilizing the output membership functions and the degree of fulfillments of the antecedents for evaluating consequents of the conditionals; and utilizing the consequents of the conditionals for determining an indicator of asset condition. Additionally, an embodiment of the invention provides a computer-readable medium having computer executable instructions recorded thereon which causes, in use, a computer running the instructions to execute a procedure according to the above computer-implemented method.

In a further aspect, an embodiment of the invention provides a nonparametric fuzzy inference system for providing an indicator of asset condition, said system comprising: means for obtaining data correlative to operation of an asset; means for creating membership functions using said obtained data; a data acquisition device for acquiring current asset data from the asset; and means for utilizing said membership functions and said current asset data for evaluating antecedents and consequents of conditionals for determining an indicator correlative to a condition of the asset.

In another further aspect, an embodiment of the invention provides a nonparametric fuzzy inference system for providing an indicator of asset condition, said system comprising: means for obtaining data correlative to operation of an asset; means for creating input membership functions and output membership functions using said obtained data; a data acquisition device for acquiring current asset data from the asset; means for utilizing said input membership functions and said current asset data for evaluating antecedents of conditionals and degree of fulfillments of said antecedents; means for utilizing said output membership functions and said degree of fulfillments of said antecedents for evaluating consequents of said conditionals; and means for utilizing said consequents of said conditionals for determining an indicator of asset condition.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 19 illustrates a table of detection results for an embodiment of the nonparametric fuzzy inference system and method predictor and an autoassociative kernel regression (AAKR) predictor.

FIG. 20A is a plot of observations, predications, and alarms for target pressure versus time for a first hydraulic unit of a mud invasion number one obtained by an embodiment of the nonparametric fuzzy inference system and method.

FIG. 20B is a plot of observations, predications, and alarms for measured pressure versus time for the first hydraulic unit of the mud invasion number one obtained by an embodiment of the nonparametric fuzzy inference system and method.

FIG. 21 is a confusion matrix of diagnosis obtained by an embodiment of the nonparametric fuzzy inference system and method.

FIG. 22 is a confusion matrix of diagnosis obtained by a k-nearest neighbor (INN) diagnosis system.

FIG. 23 illustrates a table of prognosis results for an embodiment of the nonparametric fuzzy inference system and method and an embodiment of a path classification and estimation (PACE) procedure.

FIG. 27 is a general flowchart view of an embodiment of a computer implemented method for determining an indicator correlative to a condition of an asset.

FIG. 28 is a flowchart view further detailing an embodiment of a computer implemented method for determining an indicator correlative to a condition of an asset.

DETAILED DESCRIPTION OF THE INVENTION

Figure 1:
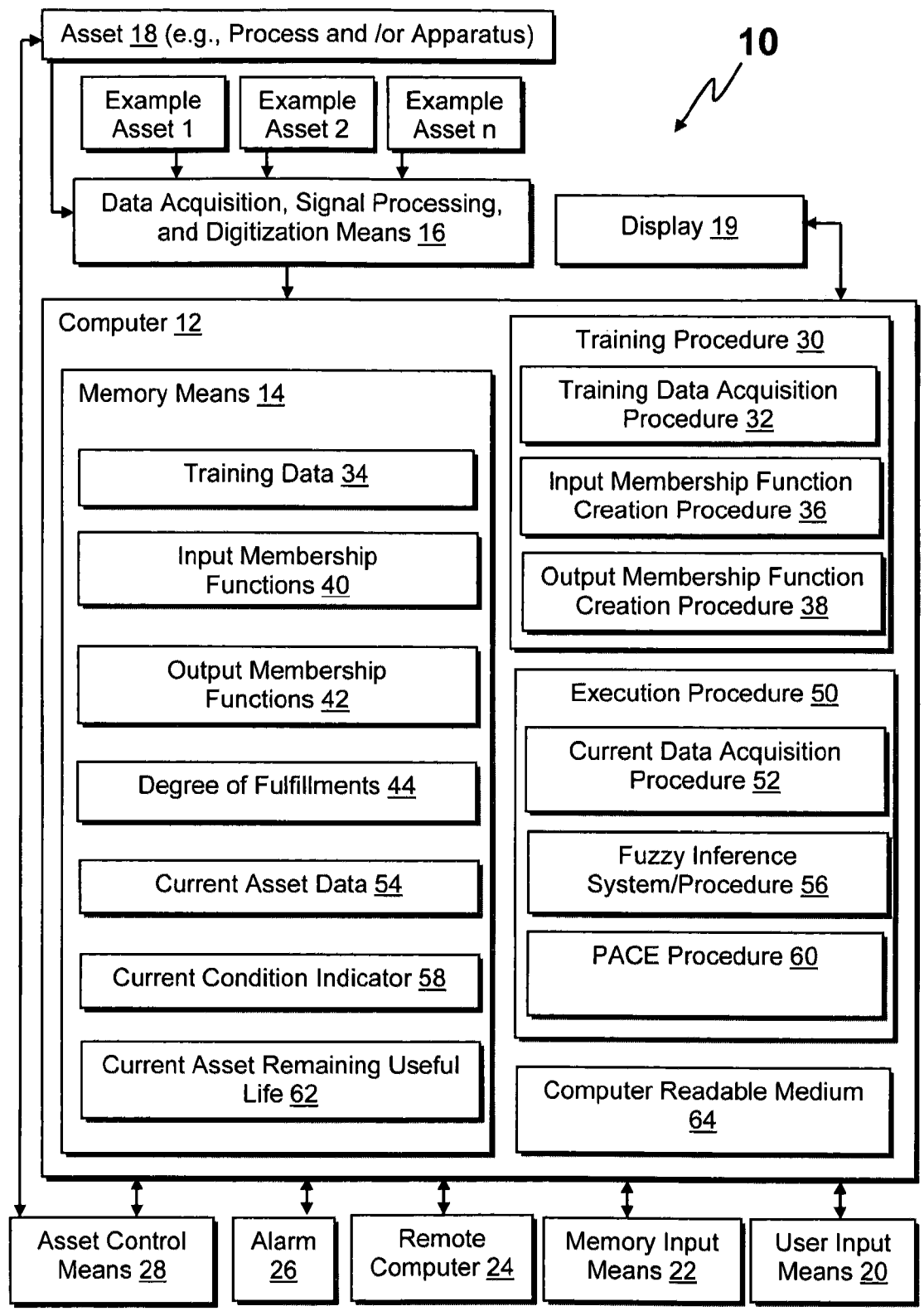
FIG. 1 is a functional block diagram of an embodiment of a nonparametric fuzzy inference system and method for providing an indicator of asset condition.

Considering the drawings, wherein like reference numerals denote like parts throughout the various drawing figures, reference numeral 10 is directed to a nonparametric fuzzy inference system and method for providing a current condition indicator that is an indicator correlative to a condition of an asset.

Figure 2:
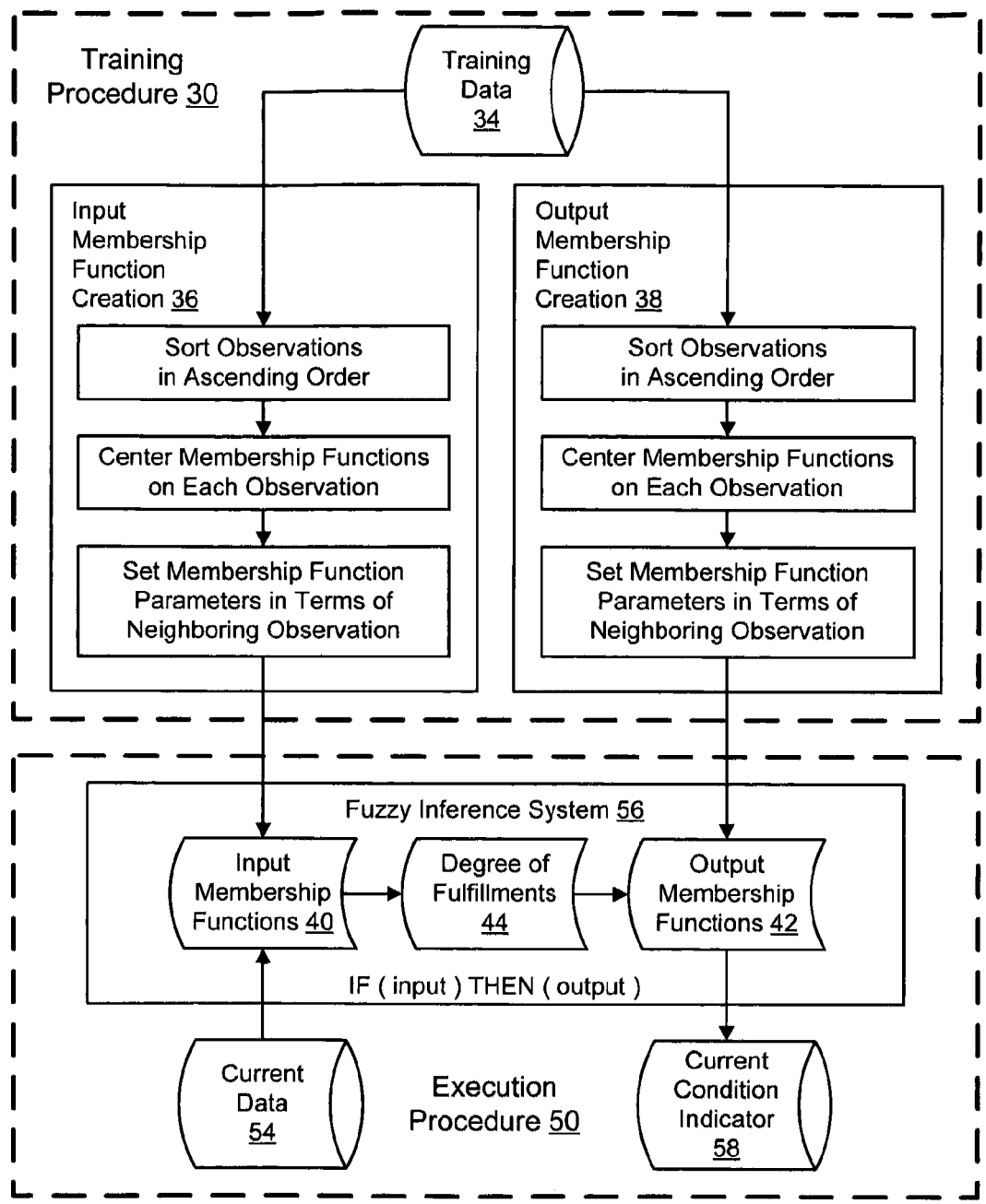
FIG. 2 is a functional flow diagram detailing an embodiment of a training procedure and an execution procedure of the nonparametric fuzzy inference system and method.

Referring to FIGS. 1 and 2, and in one embodiment, the nonparametric fuzzy inference system and method 10 is comprised of a training procedure 30 and an execution procedure 50 which, in one embodiment, are implemented with software running on a computer 12 having an associated memory means 14 for providing a current condition indicator 58 that is an indicator correlative to a condition of at least one asset 18.

In general, the training procedure 30 is comprised of a training data acquisition procedure 32 for collecting training data 34 from at least one asset such as an asset 18 to be monitored or from at least one example asset similar to asset 18 such as example assets 1, 2, . . . n. In one embodiment, the training data 34 is obtained from at least one signal from at least one asset such as asset 18 or from at least one of the example assets similar to asset 18. The training data 34 is comprised of a collection of observations wherein each of the observations contained in the training data is subsequently examined. The acquisition of the training data 34 can be provided by a data acquisition, signal processing, and digitization means 16 electrically coupled between the computer 12 and at least the one asset 18 and/or at least one of the example assets similar to asset 18. The training data 34 can also be acquired by memory means 14 of the computer 12 by means of, for example, a user input means 20, a memory input means 22, and/or a remote computer means 24.

The training procedure 30 is further comprised of an input membership function creation procedure 36 and an output membership function creation procedure 38 for respectively deriving or creating input membership functions 40 and output membership functions 42. Next, the execution procedure 50 employs a current data acquisition procedure 52 for collecting current asset data 54 from at least the one asset 18 by at least one of the manners described hereinabove for acquiring training data. The execution procedure 50 is further comprised of a fuzzy inference system/procedure 56 which employs the input and output membership functions 40, 42 for processing the current asset data 54 for providing a current condition indicator 58 that is an indicator correlative to a condition of at least one asset 18.

More specifically, and referring to FIGS. 1 and 2, the training procedure 30 is comprised of the training data acquisition procedure 32 for collecting training data 34 from at least one asset such as asset 18 to be monitored or from at least one of the example assets similar to asset 18. The training data acquisition procedure 32 then passes the training data 34 to the input and output membership function creation procedures 36 and 38 that are depicted separately for the sake of clarity. The first step in each of the membership function creation procedures 36 and 38 is to sort observations of the training data 34 in ascending order. Next, membership functions are centered on each of the sorted observations by procedures 36 and 38. Finally, parameters of the centered membership functions are set according to their respective neighbors in the sorted observations by procedures 36 and 38. The results of procedures 36 and 38 for the training data 34 are the set of input membership functions 40 and the set of output membership functions 42.

A delineation of the execution or monitoring procedure 50 will now be presented with reference to FIG. 1 and the lower half of FIG. 2. The set of input membership functions 40 and the set of output membership functions 42 obtained from the result of procedures 36 and 38 for the training data 34 are respectively stored as input and output membership functions 40 and 42 of the fuzzy inference system/procedure 56.

In its essence, the execution or monitoring procedure 50 receives current data 54 as input from at least the one asset 18 and outputs the current condition indicator 58 that is an indicator correlative to the condition of at least the one asset 18. In other words, the execution or monitoring procedure 50 infers a value of an indicator correlative to a current asset condition from observations of current asset data.

More specifically, the execution or monitoring procedure 50 uses the fuzzy inference system 56 comprised of fuzzy inference procedures for calculating degree of fulfillments 44 employing the input membership functions 42 and the current data 54 and then applying the degree of fulfillments 44 to the output membership functions 42 to obtain a current condition indicator 58 that is an indicator correlative to a condition of at least one asset 18. In this context, it is important to note that in one aspect, one point of novelty of the nonparametric fuzzy inference system and method 10 is to fully parameterize the inputs and outputs of the fuzzy inference system 56 from exemplar inputs and outputs.

Additionally, an embodiment of the nonparametric fuzzy inference system and method 10 is further comprised of: the remote computer 24 for communicating the current condition indicator 58 correlative to the condition of at least the one asset 18 thereto; an alarm 26 for effecting an alarm action as a function of the determined current condition indicator 58 correlative to the condition of at least the one asset 18; an asset control means 28 effecting a control action of at least the one asset 18 as a function of the determined current condition indicator 58 correlative to the condition of at least the one asset 18; and a display 19 for displaying the determined current condition indicator 58 correlative to the condition of at least the one asset 18.

Moreover, and in one embodiment, the nonparametric fuzzy inference system and method 10 is comprised of a computer-readable medium 64 having computer executable instructions recorded thereon which causes, in use, the computer 12 running the instructions to generally execute training procedure 30 and execution procedure 50 for providing the current condition indicator 58 correlative to the condition of at least the one asset 18. Generally, any type of computer readable medium 64 may be employed and examples include floppy disks, hard disks, CD-ROMS, Flash ROMS, nonvolatile ROM, and RAM. Additionally, memory means 14 may be employed for the computer readable medium 64.

Now that high level descriptions of the nonparametric fuzzy inference system and method 10 has been delineated hereinabove, the details of the nonparametric fuzzy inference system and method 10 are presented hereinbelow.

Nonparametric Fuzzy Inference System and Method Details

To provide clarity of the system and method 10, a variety of different modeling strategies that approximate a system with a series of functions (i.e. physical equations, polynomials, and local polynomials) are initially discussed and then followed by the contrasting approach of system and method 10.

In order to provide a series of equations that mirror a physical system, one needs to know everything about the system. Since this is never the case, a more generalized approach is needed. One method of generalization is to "fit" a generic function to the observed data. In this approach, the system is approximated with an optimized version of a well defined function. For example, if noisy data has been collected from a system and the relationships between the inputs and outputs are linear, the parameters of a generic linear function can be optimized until an objective function, such as the sum of the squared error, is minimized. This approach is often referred to as parametric modeling, since the data is used to determine the parameters (e.g., polynomial coefficients, principal components, et cetera) of a general model that approximates the observed relationships.

Additionally, if the general character of the relationships between inputs and outputs are not known then neural networks could be used since they are flexible enough to fit any function, provided the correct network architecture and parameters (weights and biases) can be specified. Models that use this architecture include kernel regression, local linear regression, the multivariate state estimation technique, and k-nearest neighbor regression. In these modeling methods, the distance of a new input to each of the historical inputs is used to calculate a similarity. This similarity is then used to predict the output by fitting a local polynomial to the data.

Now that the different modeling strategies that approximate a system with a series of functions (i.e. physical equations, polynomials, and local polynomials) have been discussed, the contrasting approach of system and method 10 follows.

At the outset, it should be noted that rather than trying to fit functions to the data, the system and method 10 interprets the physical system as an inference problem and comprises conditionals or compound IF-THEN logic statements.

Overview

Figure 3:
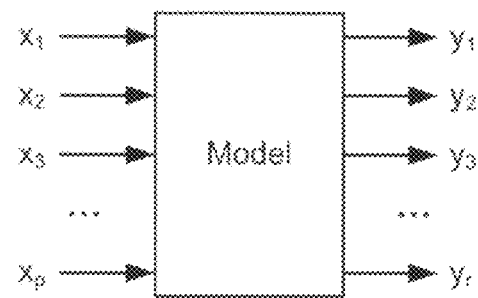
FIG. 3 illustrates a general block diagram of a generic asset model with p inputs and r outputs.

To begin, consider the general model with p inputs and r outputs, as illustrated in FIG. 3. Suppose that n exemplar observations of the inputs and outputs have been collected such as the training data 34 noted above comprising the collection of observations. For this discussion, these observations are represented by the following matrices where is the data value that is the $i^{th}$ observation of input j and $Y_{i,k}$ is the data value that is the $i^{th}$ observation of output k.

$$X = \begin{bmatrix} X_{1,1} & X_{1,2} & \ldots & X_{1,p} \\ X_{2,1} & X_{2,2} & \ldots & X_{2,p} \\ \vdots & \vdots & \ddots & \vdots \\ X_{n,1} & X_{n,2} & \ldots & X_{n,p} \end{bmatrix} \quad Y = \begin{bmatrix} Y_{1,1} & Y_{1,2} & \ldots & Y_{1,r} \\ Y_{2,1} & Y_{2,2} & \ldots & Y_{2,r} \\ \vdots & \vdots & \ddots & \vdots \\ Y_{n,1} & Y_{n,2} & \ldots & Y_{n,r} \end{bmatrix} \quad (E1)$$

In the nonparametric fuzzy inference system and method 10, the fuzzy inference system (FIS) 56 is created for mapping new inputs to the outputs. If $x_j$ is a new observation of input j and $y_k$ is an observation of output k, the fuzzy inference system 56 can be represented by the following set of IF-THEN statements.

IF $x_1=X_{1,1}$ AND $x_2=X_{1,2}$ AND ... AND $x_p=X_{1,p}$
THEN $y_1=Y_{1,1}$ AND $y_2=Y_{1,2}$ AND ... AND $y_r=Y_{1,r}$
IF $x_1=X_{2,1}$ AND $x_2=X_{2,2}$ AND ... AND $x_p=X_{2,p}$
THEN $y_1=Y_{2,1}$ AND $y_2=Y_{2,2}$ AND ... AND $y_r=Y_{2,r}$
IF $x_1=X_{n,1}$ AND $x_2=X_{n,2}$ AND ... AND $x_p=X_{n,p}$
THEN $y_1=Y_{n,1}$ AND $y_2=Y_{n,2}$ AND ... AND $y_r=Y_{n,r}$

Using the above IF-THEN statements, an estimation procedure for the FIS can be described by the following two step process.

Evaluate the antecedent: Fuzzy membership functions are used to determine the extent by which each antecedent (IF) "fires".

Evaluate the consequent: The "fired" consequents (THEN) are aggregated into estimates of the outputs.

Before the above steps are discussed in detail, the fuzzy inference system 56 of the nonparametric fuzzy inference system and method 10 will be examined hereinbelow.

Membership Function Creation

The nonparametric fuzzy inference system and method 10 defines the nonparametric fuzzy inference system as a fuzzy inference system whose membership function centers and parameters are observations of exemplar inputs and outputs. This approach is unique in that previous algorithms described in the literature use "composed" observations to parameterize the membership functions (MF) as delineated in the Background of the Invention section hereinabove.

For the nonparametric fuzzy inference system and method 10, the problem of creating membership functions from n exemplar observations of the inputs (X) and outputs (Y) is considered. Since the membership function creation is the same for the inputs and outputs, the discussion will only consider the inputs (X). Also, the membership of the input j to the $i^{th}$ exemplar observation of input j will be denoted by $\mu_{X_{i,j}}(x_j)$.

To begin, the nonparametric fuzzy inference system and method 10 considers the specific example of creating the membership functions for five exemplar observations of a single input. For the sake of simplicity, it is assumed that the exemplars are sorted from smallest to largest.

$$X = \begin{bmatrix} X_{1,1} \\ X_{2,1} \\ X_{3,1} \\ X_{4,1} \\ X_{5,1} \end{bmatrix} \quad X_{1,1} < X_{2,1} < X_{3,1} < X_{4,1} < X_{5,1} \quad (E2)$$

The simplest membership functions that can be created from the exemplar observations are singleton membership functions. These membership functions have zero memberships for any value of x except when they are exactly equal to the exemplars, in which case they have a membership of 1. A possible instantiation of the singleton membership functions for the example is presented in FIG. 4.

Figure 4:
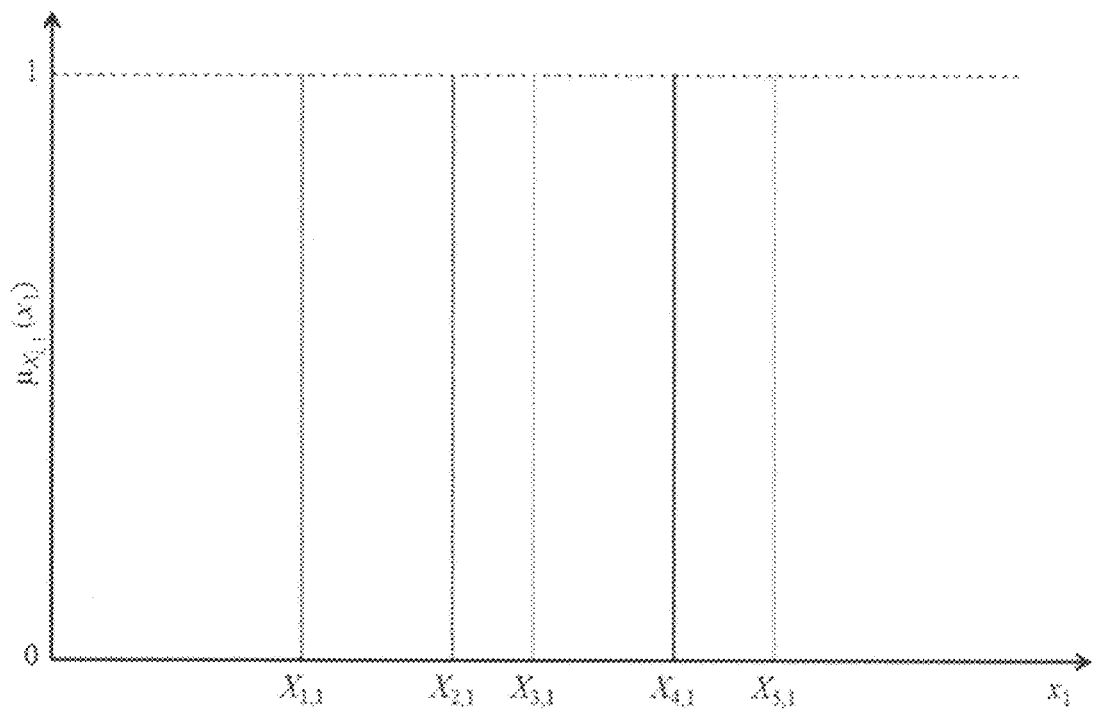
FIG. 4 is a graphical view of an example of singleton membership functions.

For the remaining discussion, the singleton membership functions presented in FIG. 4 will be modified into a series of triangular membership functions. To do this, an overlap parameter is introduced, which will control the extent by which the membership functions overlap each other. For this example, an overlap of two is used. This means that the legs of each triangular membership function will overlap its two nearest neighbors.

Figure 5:
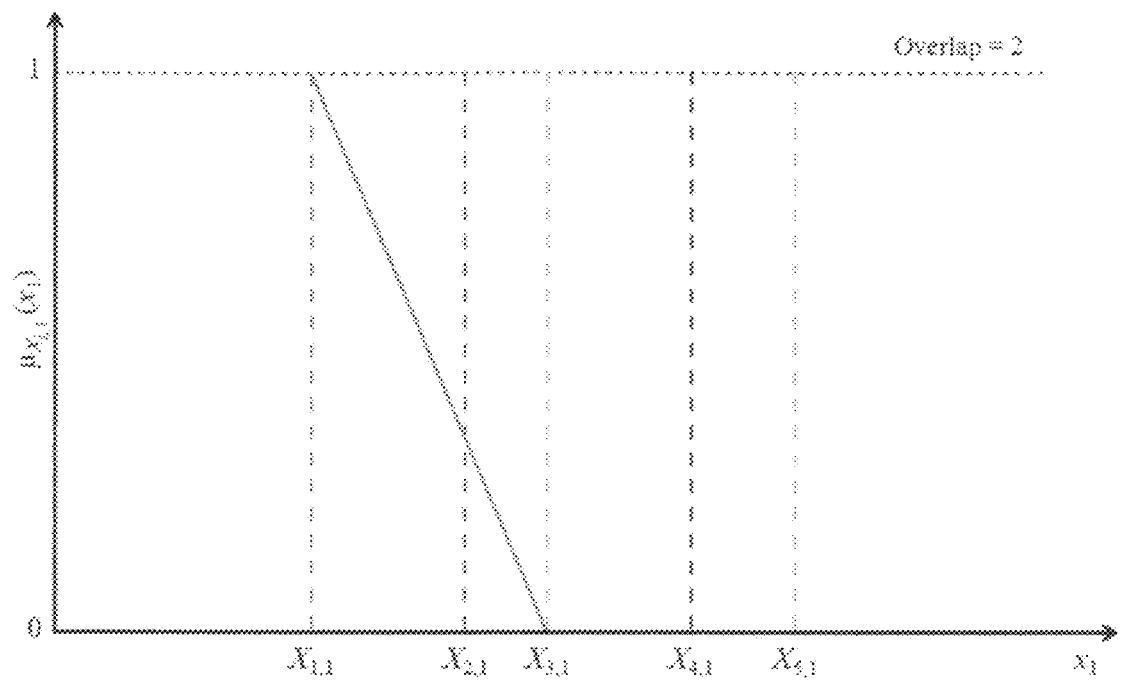
FIG. 5 is a graphical view of a result of setting a right leg of a triangular membership function for the first exemplar observation or singleton membership function shown in FIG. 4.

To begin, consider the smallest exemplar, specifically $X_{1,1}$. Since it has no neighbors to the left, this leg cannot easily be set. However, the right leg can be set. Since the overlap is 2, the right leg of the triangular membership function is set to $X_{1+2,1}=X_{3,1}$. The result is illustrated in FIG. 5.

Figure 6:
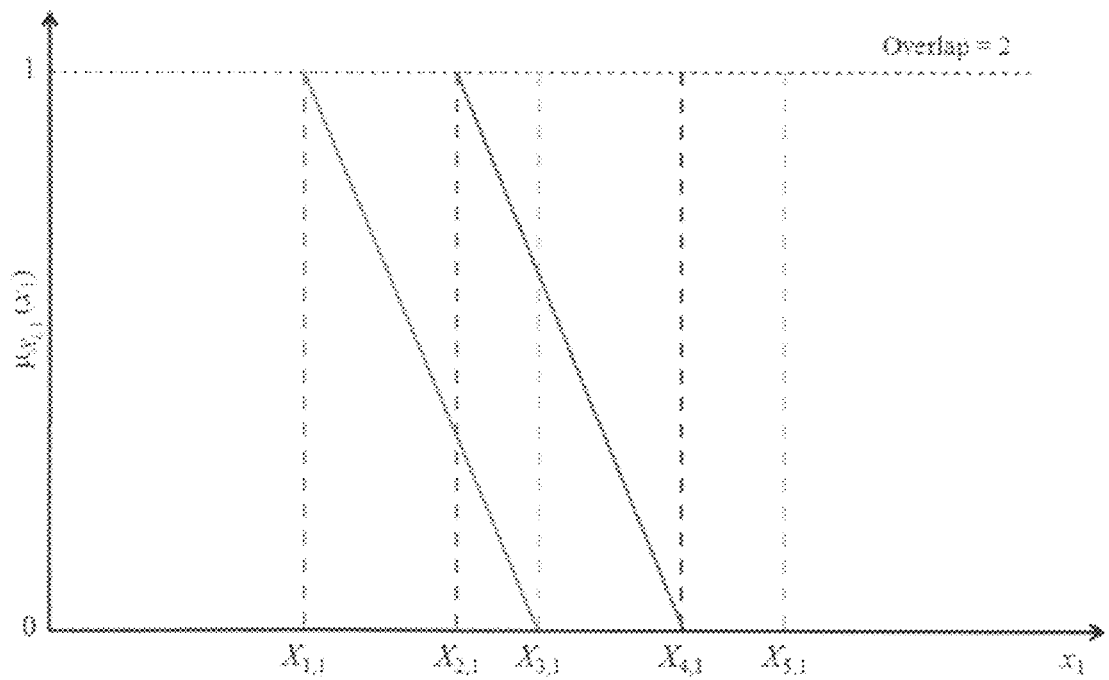
FIG. 6 is a graphical view of a result of setting a right leg of a triangular membership function for a second exemplar observation or singleton membership function shown in FIG. 5.

The next exemplar observation $X_{2,1}$ also has no second neighbor to the left. Since $X_{2-2,1}=X_{0,1}$ is not defined, the left leg cannot be set at this time. However, the right leg can be set to $X_{2+2,1}=X_{4,1}$. The result is illustrated in FIG. 6.

Figure 7:
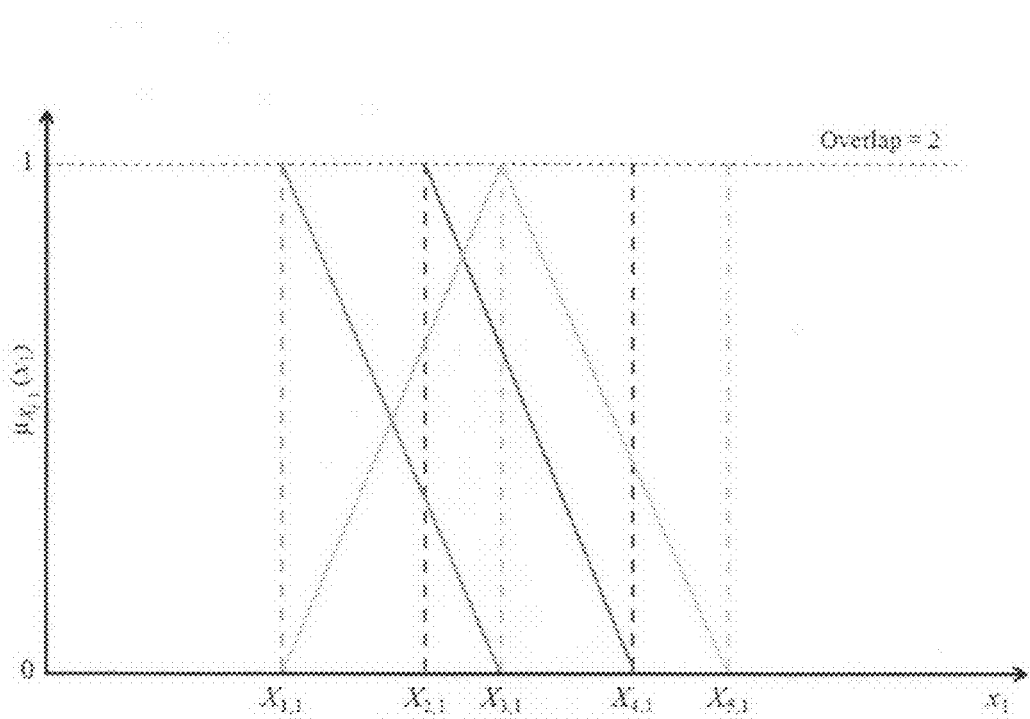
FIG. 7 is a graphical view of a result of setting a right leg and a left leg of a triangular membership function for a third exemplar observation or singleton membership function shown in FIG. 6.

The third exemplar observation, specifically $X_{3,1}$, has second neighbors to the left and right. More specifically, $X_{3-2,1}=X_{1,1}$ and $X_{3+2,1}=X_{5,1}$ are defined. This means that the left and right legs of the triangular membership function can be set directly resulting in the state illustrated in FIG. 7.

Figure 8:
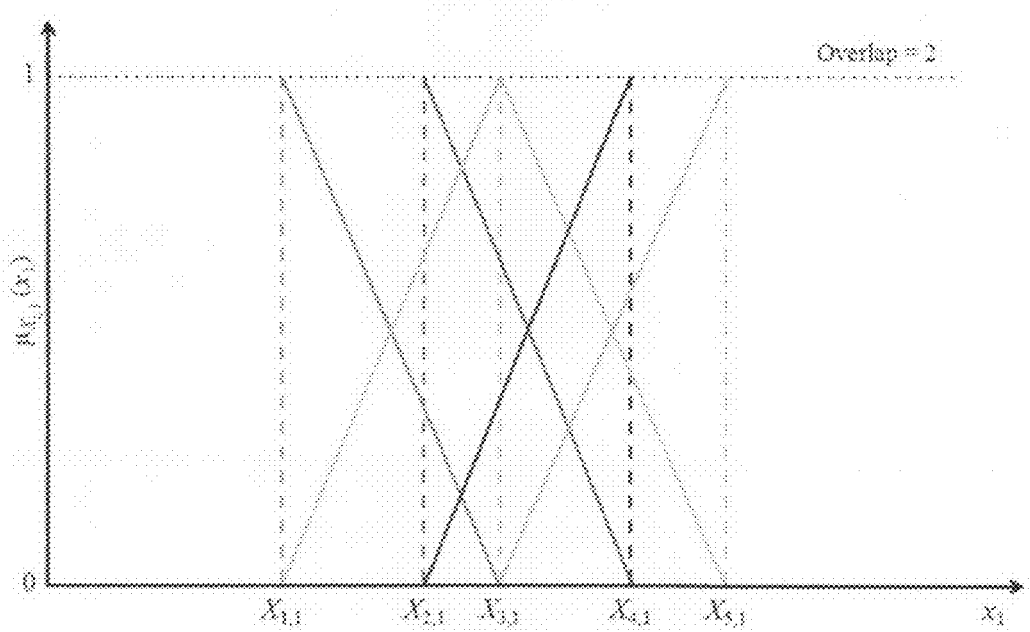
FIG. 8 is a graphical view of a result of setting a left leg of a triangular membership function for a fourth exemplar observation or singleton membership function shown in FIG. 7 and of a result of setting a left leg of a triangular membership function for a fifth exemplar observation or singleton membership function shown in FIG. 7.

At this point, the membership functions for the fourth and fifth exemplar observations are created. Notice that for these two exemplar observations $X_{4+2,1}=X_{6,1}$ and $X_{5+2,1}=X_{7,1}$ are not defined. Therefore, the right legs of the membership functions cannot be set at this time. However, the left legs can be set to $X_{4-2,1}=X_{2,1}$ and $X_{5-2,1}=X_{3,1}$ respectively. The result of these operations is illustrated in FIG. 8.

Figure 9:
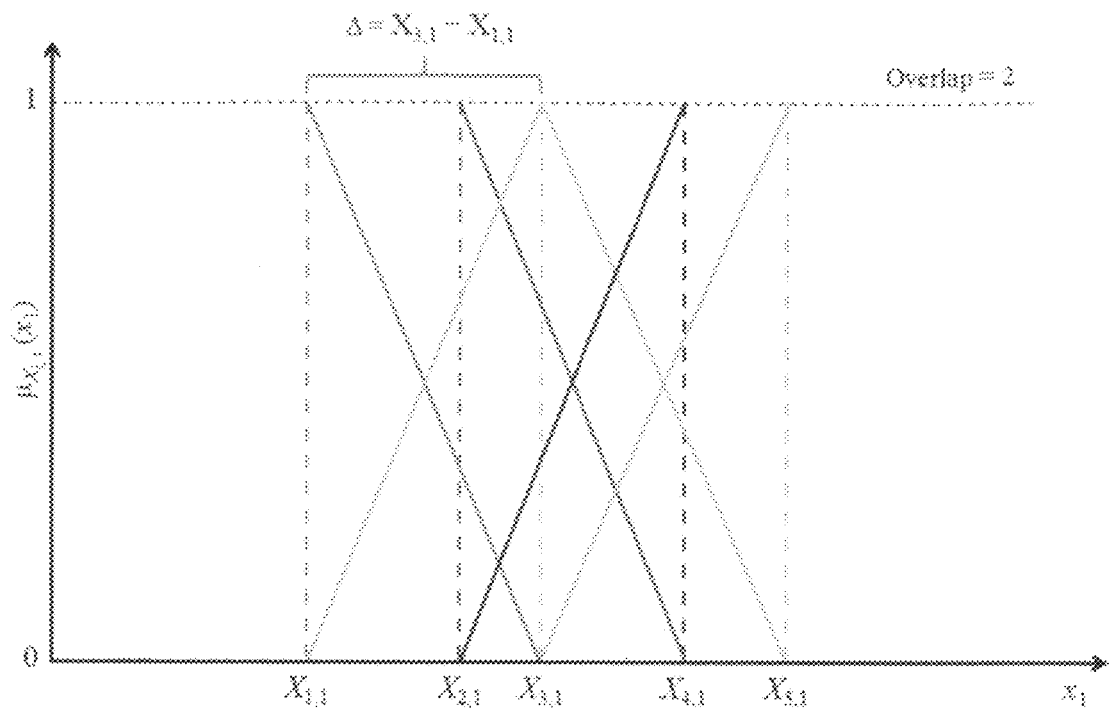
FIG. 9 is a graphical view illustration for calculating a half width of the triangular membership function for the first exemplar observation shown in FIG. 8.

Finally, the process for setting the remaining legs of the triangular membership functions is presented. To set the left leg of the first exemplar $X_{1,1}$, the distance between $X_{1,1}$ and its second nearest neighbor, specifically $X_{1+2,1}=X_{3,1}$, needs to be determined (FIG. 9). This difference is defined to be the half width of the membership function and is denoted by $\Delta$.

Figure 10:
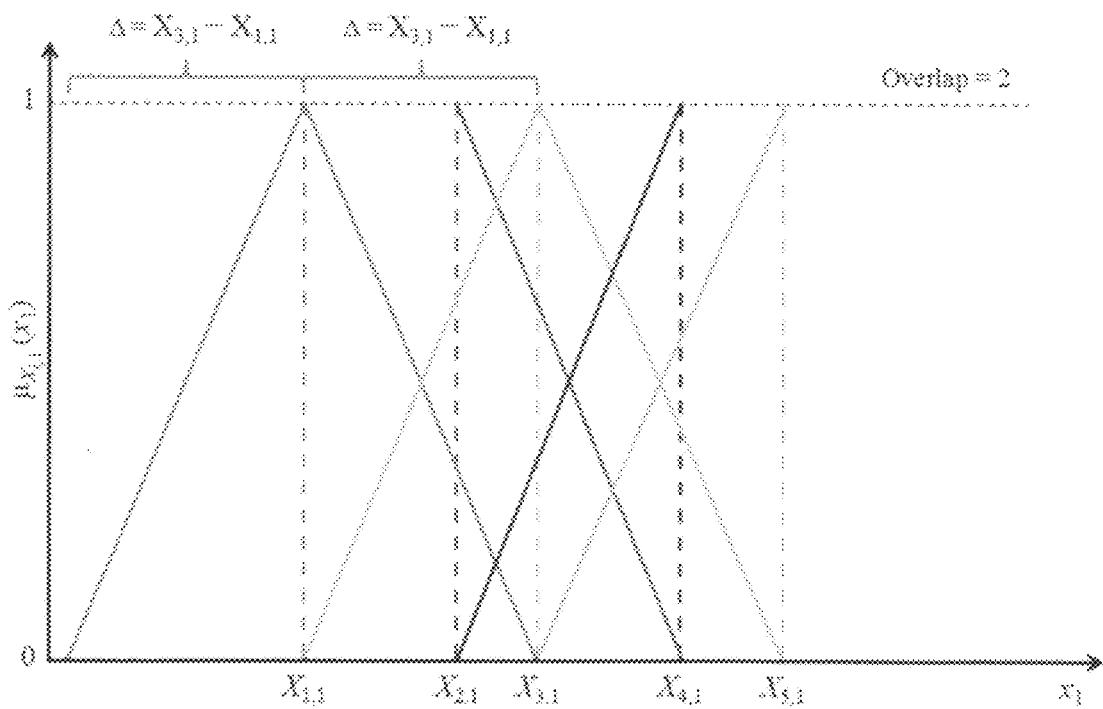
FIG. 10 is a graphical view of a result of setting a left leg of the triangular membership function for the first exemplar observation or singleton membership function shown in FIG. 9.
Figures 11, 12:
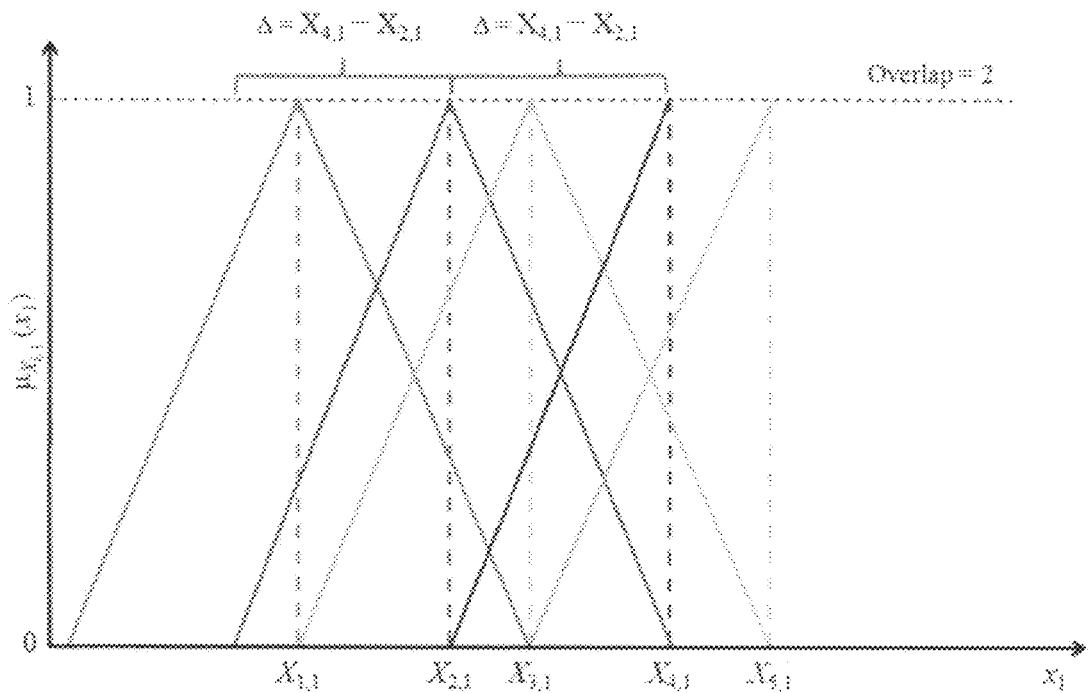
FIG. 11 is a graphical view of a result of setting a left leg of the triangular membership function for the second exemplar observation or singleton membership function shown in FIG. 10.
FIG. 12 illustrates a table of equations for setting the right legs of the membership functions for the fourth and the fifth exemplar observations.

Now that the half width of the membership function has been defined, the left leg of the membership function for the first exemplar observation is set to $X_{1,1}-\Delta$ (see FIG. 10). To set the left leg of the membership function for the second exemplar observation, a similar procedure is followed, with the exception that the half width is $X_{4,1}-X_{2,1}$, as opposed to $X_{3,1}-X_{1,1}$ for the first exemplar observation. The result is illustrated in FIG. 11.

Figure 13:
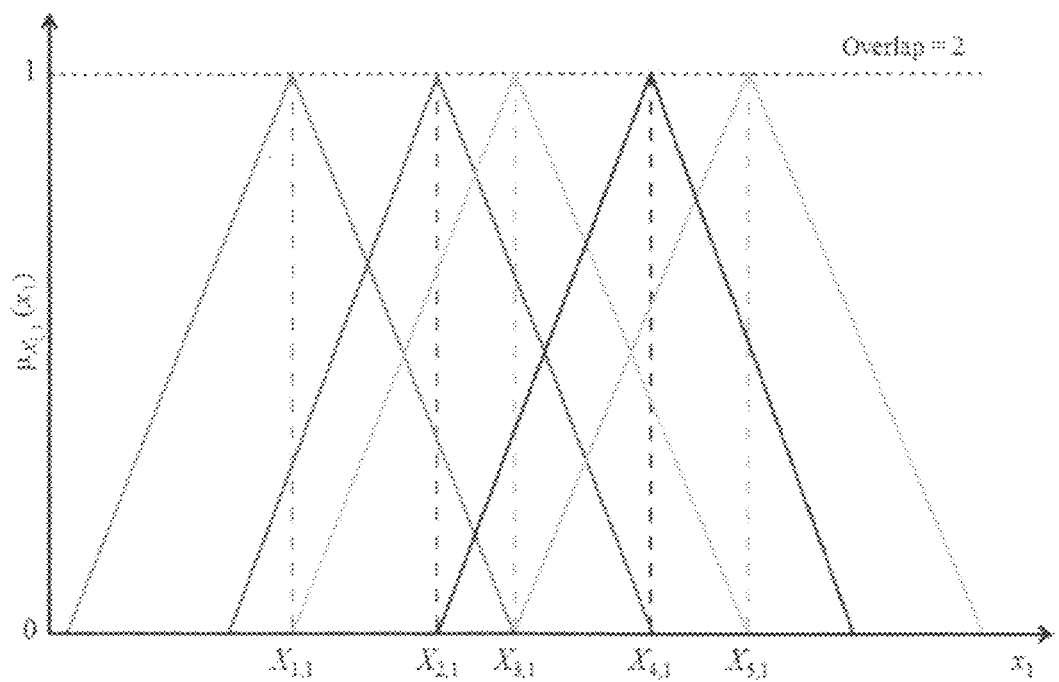
FIG. 13 is a graphical view of a result of setting a right leg of a triangular membership function for the fourth exemplar observation or singleton membership function shown in FIG. 11 and of a result of setting a right leg of a triangular membership function for the fifth exemplar observation or singleton membership function shown in FIG. 11 for obtaining final triangular membership functions for the five exemplar observations having an overlap of two.

Finally, the concept of half width can be used to set the right legs of the membership functions for the fourth and fifth exemplar observations. For completeness, the details of this procedure are provided in a table illustrated in FIG. 12. Since the right legs are being set, the half width is added to the exemplar observation instead of being subtracted. Applying the equations listed in FIG. 12, the membership function creation process has concluded. The final membership functions for this example are illustrated in FIG. 13.

Figure 14:
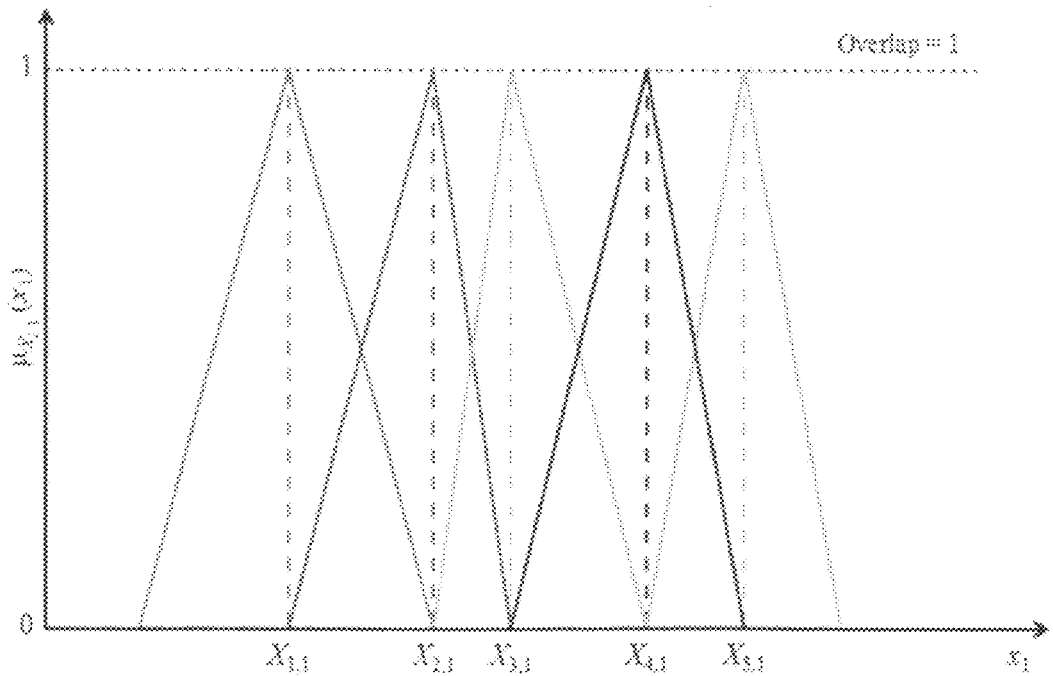
FIG. 14 is a graphical view of final triangular membership functions for the five exemplar observations and an overlap of one.

Before continuing, it is instructive to examine the effect of the value of the overlap parameter on the shape of the membership functions. Suppose an overlap of one was used instead of two for this example. In this alternative case, it can be seen in FIG. 14 that the membership functions are narrower.

Now that the method or process used by the nonparametric fuzzy inference system and method 10 to create the membership functions directly from data has been delineated hereinabove, a method or process used by the nonparametric fuzzy inference system and method 10 can be examined for using the resulting membership functions for evaluating the antecedent and consequent of the previously described IF-THEN statements.

Evaluating the Antecedent

To illustrate the antecedent evaluation process, consider that n exemplar observations of p inputs have been collected and an estimate of the output is needed for a new observation of the inputs, x. In matrix form, the query can be written as follows, where $x_j$ is the query observation for the $j^{th}$ input:

$$x = [x_1 \ldots x_p] \quad (E3)$$

The first step in evaluating the antecedents is to obtain the membership of the input observation to each of the n input exemplars. The resulting memberships can be placed in a nxp matrix of memberships, where $\mu_{X_{i,j}}(x_j)$ is the membership of $x_j$ to the $i^{th}$ exemplar observation of the $j^{th}$ signal, $X_{i,j}$:

$$\mu(x) = \begin{bmatrix} \mu_{X_{1,1}}(x_1) & \mu_{X_{1,2}}(x_2) & \ldots & \mu_{X_{1,p}}(x_p) \\ \mu_{X_{2,1}}(x_1) & \mu_{X_{2,2}}(x_2) & \ldots & \mu_{X_{2,p}}(x_p) \\ \vdots & \vdots & \ddots & \vdots \\ \mu_{X_{n,1}}(x_1) & \mu_{X_{n,2}}(x_2) & \ldots & \mu_{X_{n,p}}(x_p) \end{bmatrix} \quad (E4)$$

Next, the memberships over the p inputs are used to determine the degree by which the antecedent for each exemplar "fires." If the traditional AND operator is used, then a degree of fulfillment (DOF) of the query observation for the n input exemplars are the minimum memberships over the p inputs.

Applying the AND operator to the nxp matrix of memberships, the vector of n degree of fulfillments 44 is obtained, where $\wedge$ is the minimum operator.

$$DOF(X, x) = \begin{bmatrix} \mu_{X_{1,1}}(x_1) \wedge \mu_{X_{1,2}}(x_2) \wedge \ldots \wedge \mu_{X_{1,p}}(x_p) \\ \mu_{X_{2,1}}(x_1) \wedge \mu_{X_{2,2}}(x_2) \wedge \ldots \wedge \mu_{X_{2,p}}(x_p) \\ \vdots \\ \mu_{X_{n,1}}(x_1) \wedge \mu_{X_{n,2}}(x_2) \wedge \ldots \wedge \mu_{X_{n,p}}(x_p) \end{bmatrix} \quad (E5)$$

As an example, consider the following hypothetical case where memberships of a query pattern to 4 exemplar observations of 3 inputs have been calculated.

$$\mu(x) = \begin{bmatrix} 0.1 & 0.3 & 0.5 \\ 0.0 & 1.0 & 0.3 \\ 0.9 & 0.3 & 0.1 \\ 0.2 & 0.5 & 1.0 \end{bmatrix} \quad (E6)$$

The DOF is calculated by taking the minimum value in each row of the matrix of memberships.

$$DOF(X, x) = \begin{bmatrix} 0.1 \wedge 0.3 \wedge 0.5 \\ 0.0 \wedge 1.0 \wedge 0.3 \\ 0.9 \wedge 0.3 \wedge 0.1 \\ 0.2 \wedge 0.5 \wedge 1.0 \end{bmatrix} = \begin{bmatrix} 0.1 \\ 0.0 \\ 0.1 \\ 0.2 \end{bmatrix} \quad (E7)$$

The process for evaluating the antecedents has been described hereinabove. An examination of how the degree of fulfillments 44 are used to evaluate the consequents and, eventually, generate an estimate of the outputs will be delineated hereinbelow.

Evaluating the Consequent

Figure 15:
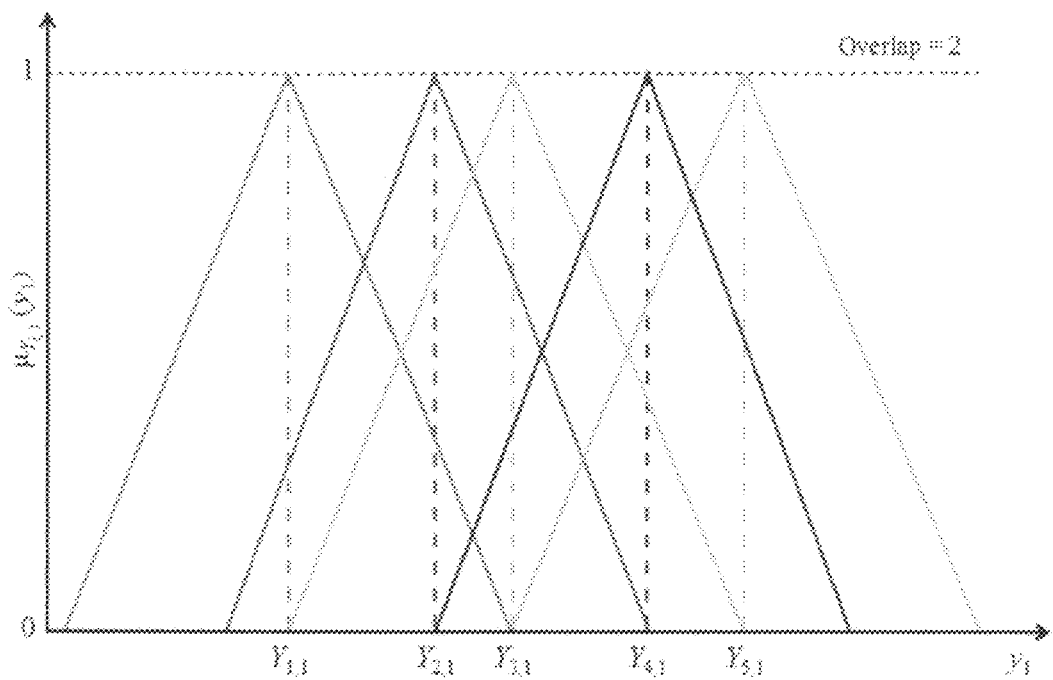
FIG. 15 is a graphical view of output triangular membership functions for an overlap of two.

The consequent of the FIS is evaluated by performing the following steps: 1) calculating clipped memberships of the consequent membership functions, where the membership is clipped to the DOF of the antecedent, 2) aggregating the membership functions for each output signal over the n exemplars using the logical OR (maximum operator), and 3) defuzzifying the aggregated membership functions for the r outputs into estimates. For this discussion, consider the following exemplars for a single output. A possible instantiation of the membership functions for the output is presented in FIG. 15.

$$Y = \begin{bmatrix} Y_{1,1} \\ Y_{2,1} \\ Y_{3,1} \\ Y_{4,1} \\ Y_{5,1} \end{bmatrix} \quad Y_{1,1} < Y_{2,1} < Y_{3,1} < Y_{4,1} < Y_{5,1} \quad (E8)$$

Furthermore, suppose the DOF of the five input exemplars for a query observation are as follows:

$$DOF(X, x) = \begin{bmatrix} 0.0 \\ 0.5 \\ 1.0 \\ 0.5 \\ 0.0 \end{bmatrix} \quad (E9)$$

To describe the consequent evaluation process, the above DOFs will be used to step through the previously described process.

Figure 16:
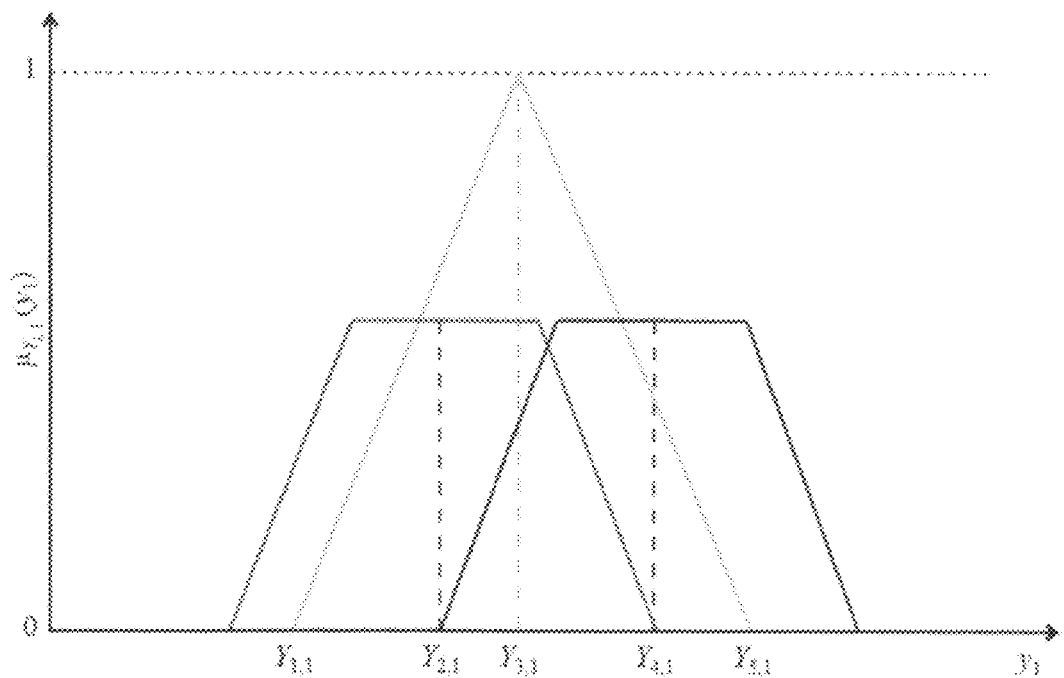
FIG. 16 is a graphical view of clipped memberships for the output triangular membership functions shown in FIG. 15.

To obtain the clipped memberships, the output membership functions are "clipped" to the DOFs. Applying the example DOFs to the membership functions presented in FIG. 15, the level sets presented in FIG. 16 are obtained. Notice that the only membership functions that are not zero are the membership functions with non-zero DOFs. Also, notice that the two membership functions with a DOF of 0.5 do not have memberships larger than 0.5.

Figure 17:
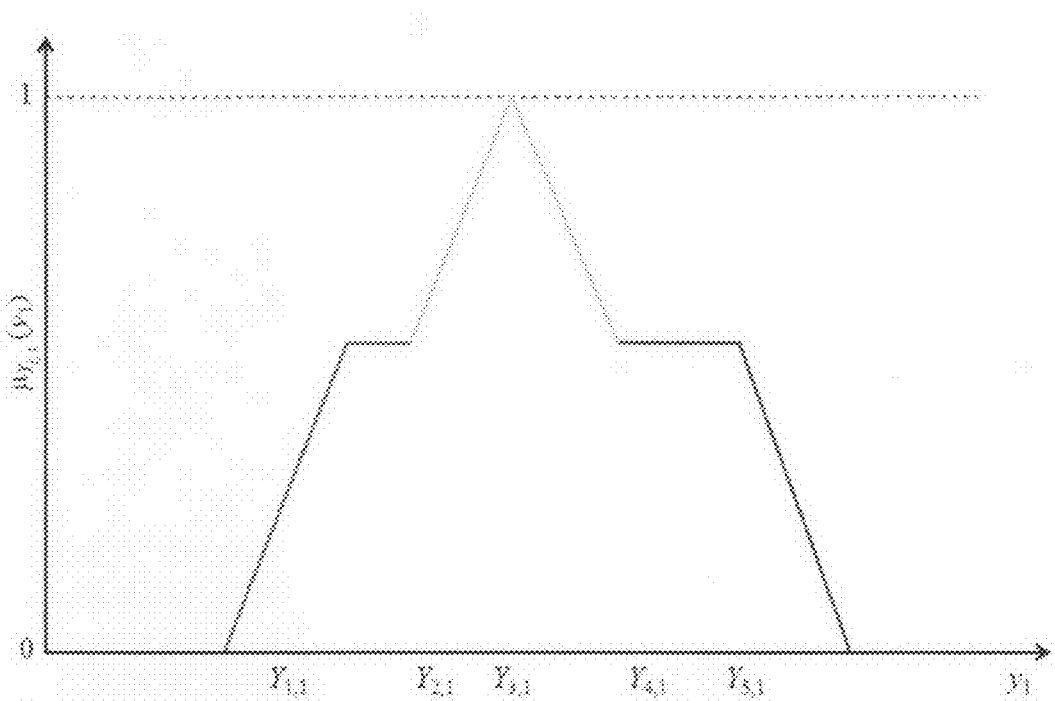
FIG. 17 is a graphical view of combined level sets of that which is shown in FIG. 16.

The next step in the process is to aggregate the level sets into a single membership function for the estimate of the output. To do this the logical OR or union, which sets the membership to be the maximum membership over the range of outputs, is used. The result of this operation is illustrated in FIG. 17.

Finally, the aggregated output membership function is defuzzified into an estimate of the output. For this example a center of area (COA) defuzzification method is used. The COA defuzzification method sets the prediction to the value that balances the area of the aggregated membership function. If $\mu_A(y_1)$ is the aggregated membership function for the output and N is the number of elements on the universe of discourse (UOD) of the output (i.e. number of points in the membership function arrays), then the prediction using COA defuzzification is given by:

$$\hat{y}_1 = \frac{\sum_{i=1}^{N} \mu_A(y_i) Y_{1,i}}{\sum_{i=1}^{N} \mu_A(y_i)} \quad (E10)$$

Figure 18:
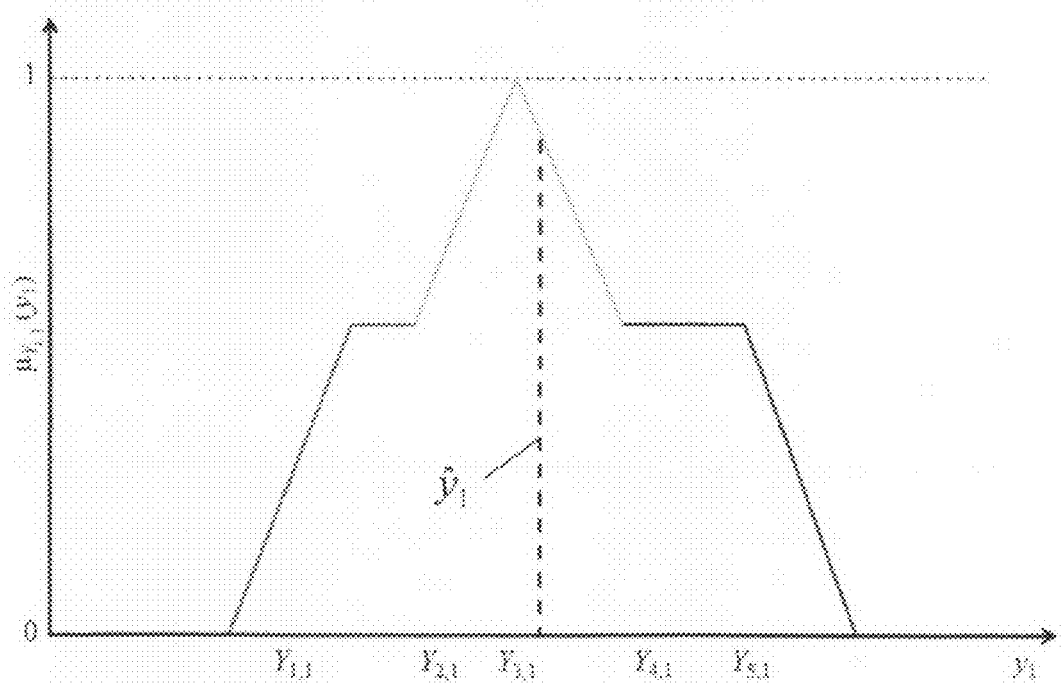
FIG. 18 is a graphical view of that which is shown in FIG. 17 with a prediction of the output with center of area defuzzification.

Graphically, the prediction is illustrated in FIG. 18 to be slightly off center, due to the slightly larger width of the membership function for the fourth exemplar observation.

An alternative to the previously described process is to apply the DOF of the antecedents directly to the output exemplars. In this case, the output is a simple weighted average of the output exemplars where the weights are the DOF of the antecedents. If $DOF(X_i,x)$ is the degree of fulfillment of the $i^{th}$ antecedent, then the predicted output can be written as:

$$\hat{y}_1 = \frac{\sum_{i=1}^{N} DOF(X_i, x) Y_{1,i}}{\sum_{i=1}^{N} DOF(X_i, x)} \quad (E11)$$

A detailed description of the nonparametric fuzzy inference system and method 10 has now been presented hereinabove. Hereinbelow, exemplary applications of the nonparametric fuzzy inference system and method 10 are presented.

Exemplary Applications

In use and operation, and referring to the drawings, the nonparametric fuzzy inference system and method 10 will be further exemplified from the results of its use and operation as a predictor, diagnoser, and as a component in a prognoser to assess the health and remaining useful life (RUL) of, for example, a steering system of an oil drill. Each of these individual tasks fundamentally answers the following series of questions. Is there a fault? If there is a fault, what is the fault? Finally, what is the RUL?

To determine if there is a fault, the nonparametric fuzzy inference system and method 10 was used as an autoassociative predictor for the signals collected from hydraulic units. The estimates for the signal's fault free value were then compared against their respective measured values by calculating the residual. Finally, a sequential probability ratio test (SPRT) was used to determine if the system was operating in a nominal or degraded mode. If a sufficient number of alarms are generated by the SPRT, then a fault is deemed to be detected.

If a fault is detected, then a class of the fault is determined. The nonparametric fuzzy inference system and method 10 was used to infer the fault class from observations of the estimate residuals with alarms. Here, the nonparametric fuzzy inference system and method 10 is trained with exemplar residuals as inputs and a binary coding of the fault possibilities as outputs.

Finally, the nonparametric fuzzy inference system and method 10 was used to perform the classification and estimation tasks in a path classification and estimation (PACE) prognosis procedure 60, which is described at the end of this section. In this implementation, the nonparametric fuzzy inference system and method 10 was trained to map observations of a degradation signal to the remaining useful life (RUL) 62 of the asset.

To evaluate the performance of the different embodiments of the nonparametric fuzzy inference system and method 10, it was compared to alternative methods that are currently available in the literature. For comparison, auto-associative kernel regression (AAKR) was used as a predictor for detection and k-nearest neighbor (kNN) was used as a classifier for diagnosis. Since there are no "real world" prognosis algorithms in the literature, a system for use in comparison to the PACE procedure 60 was not possible.

Furthermore, eleven data sets which progress to failure were used. These data sets represent three different fault conditions: mud invasion—mud enters hydraulic units and causes failure (3 data sets); pressure transducer offset—sensor offset (negative and positive) causes problems in the control of the system, which eventually results in system failure (two negative offset & three positive offset); and pump startup failure—pump failure shortly after the drill is started (3 data sets).

The results of the detection system implementing a nonparametric fuzzy inference system and method 10 and AAKR predictor and SPRT detector are illustrated in FIG. 19. For this work, the warning time is defined as the length of time from the instance of five sequential alarms and the time of failure. The instance of five sequential alarms was used as an indicator of warning time because the occurrence of multiple sequential alarms is more likely due to an actual fault or anomaly as opposed to spurious alarms. Notice that both monitoring systems detect faults in ten of the eleven data sets, which translates to a detection rate of approximately 91%. The missed detection was determined to be attributable to insufficient data (approximately one hour of data compared to one hundred hours in the largest set). Therefore, if a precursor was present, it didn't have enough time to propagate to a measurable magnitude. Finally, notice that the warning times of the nonparametric fuzzy inference system and method 10 and AAKR monitoring system are comparable, both having values near twenty hours. The AAKR system performance is slightly better than the nonparametric fuzzy inference system and method 10 system, in that the warning time is slightly larger. These results indicate that the nonparametric fuzzy inference system and method 10 is a viable prediction algorithm for detecting faults in the steering system.

Figure 20C:
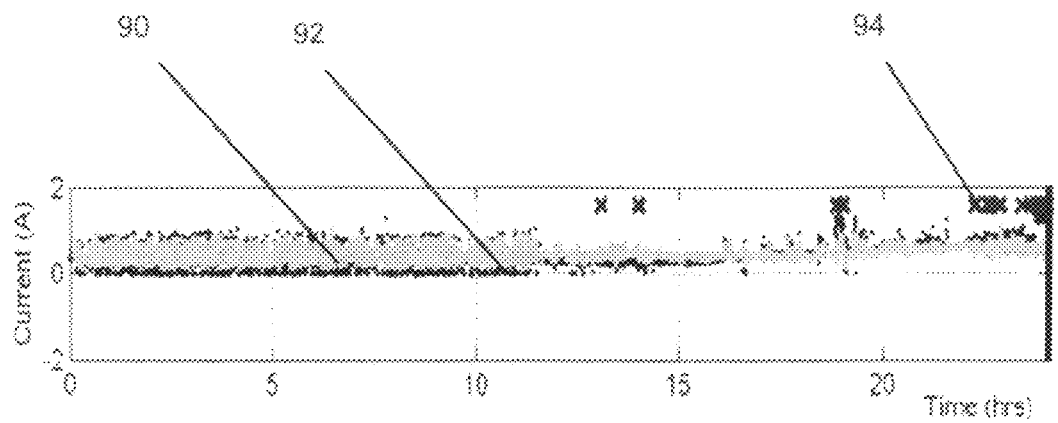
FIG. 20C is a plot of observations, predications, and alarms for electric current versus time for the first hydraulic unit of the mud invasion number one obtained by an embodiment of the nonparametric fuzzy inference system and method.
Figure 20D:
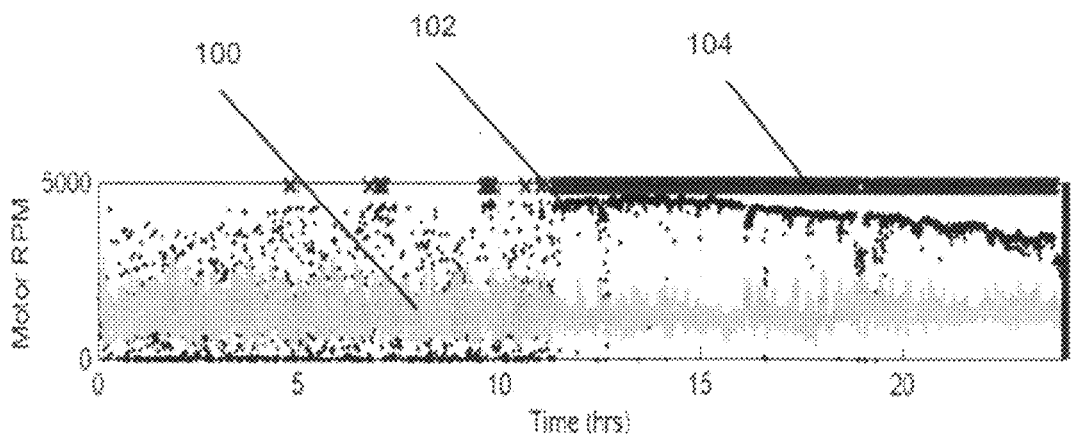
FIG. 20D is a plot of observations, predications, and alarms for motor RPM versus time for the first hydraulic unit of the mud invasion number one obtained by an embodiment of the nonparametric fuzzy inference system and method.

Before continuing, consider an example in which there are strong indicators for a fault. Specifically, FIG. 20A is a plot of observations 70, predications 72, and alarms 74 for target pressure versus time for a first hydraulic unit of a mud invasion (MI) number one obtained by an embodiment of the nonparametric fuzzy inference system and method 10; FIG. 20B is a plot of observations 80, predications 82, and alarms 84 for measured pressure versus time for the first hydraulic unit of the mud invasion number one obtained by an embodiment of the nonparametric fuzzy inference system and method 10; FIG. 20C is a plot of observations 90, predications 92, and alarms 94 for electric current versus time for the first hydraulic unit of the mud invasion number one obtained by an embodiment of the nonparametric fuzzy inference system and method 10; and FIG. 20D is a plot of observations 100, predications 102, and alarms 104 for motor RPM versus time for the first hydraulic unit of the mud invasion number one obtained by an embodiment of the nonparametric fuzzy inference system and method. Notice that there are a series of fault alarms in the motor RPM signal (FIG. 20D) and measured pressure (FIG. 20B) starting around the $11^{th}$ hour of operation. It can also be seen that fault alarms are also present in the target pressure (FIG. 20A) and electric current (FIG. 20C) beginning around the $22^{nd}$ hour of operation.

The diagnosis results of the nonparametric fuzzy inference system and method 10 and kNN diagnosers are presented in the confusion matrices, FIG. 21 and FIG. 22 respectively. In the tables, the number of nonparametric fuzzy inference system and method 10 or kNN classifications for the different data sets is presented in the columns. For example, the number of classifications for the tested mud invasion (MI) data set is presented in the first column. The count in the first row is the number of MI faults that are classified correctly as being MI, the second row is the number of pressure transducer offset (PTO) faults that are incorrectly classified as MI faults, and the third row is the number of pump startup (PS) faults that are incorrectly classified as MI faults. Ideally, only the diagonal of elements of the confusion matrix should be non-zero, since these elements represent correct classifications.

Notice that both diagnosers are able to accurately diagnose the three fault conditions. More specifically, the overall accuracy of the nonparametric fuzzy inference system and method 10 diagnosis system is approximately 94%, while the accuracy of the INN diagnosis system is approximately 88%. For this analysis, the performance of the nonparametric fuzzy inference system and method 10 diagnosis system is somewhat better than the kNN system, but a more important feature of the results is that the nonparametric fuzzy inference system and method 10 diagnoser performance is comparable to the traditional kNN diagnoser.

The results of using the nonparametric fuzzy inference system and method 10 for remaining useful life (RUL) estimation are presented in FIG. 23. Again, MI refers to mud invasion, PTO refers to pressure transducer offset, and PS refers to pump startup. Here, OTF refers to onset to failure or the time when one hundred fault alarms have been registered. The mean lifetime after OTF is included to aid in interpreting the scale in the RUL estimate errors, i.e. the mean absolute error (MAE) should be small relative to the lifetime after OTF.

It can be seen that for the MI and PTO data sets, the nonparametric fuzzy inference system and method 10 is able to estimate the RUL with a high degree of accuracy, in that the MAE is less than an hour. Next, notice that the RUL estimates for the PTO and PS data sets are progressively less accurate then the estimates for the MI data. This result is expected since we are estimating the RUL by performing a regression with two data points (two training histories for MI, PTO, and PS). As additional data is integrated into the described system, the performance should improve considerably.

This exemplary application has demonstrated that the nonparametric fuzzy inference system and method 10 can be easily adapted to many different applications that include, but are not limited to, prediction, diagnosis, and prognosis.

At this point, it is necessary to describe the path classification and estimation (PACE) procedure 60 and its implementation that uses the nonparametric fuzzy inference system and method 10 in this example. A general path model (GPM) is founded on the concept that a degradation signal collected from an individual device will follow a general path until it reaches an associated failure threshold. Since its introduction, the thought model proposed in the GPM has been prolifically adopted by modern researchers and has resulted in a plethora of techniques that can be related to the GPM in one way or another. From this cursory description, it can be seen that there are two fundamental assumptions of the GPM and its modern counterparts: 1) there exists a path for the degradation signal that can be parameterized via regression, machine learning, etc. and 2) there exists a failure threshold for the degradation signal that accurately predicts when a device will fail. For modern computational capacity, the first assumption is trivial, in that many methods exist for parameterizing simple (polynomial regression, power regression, etc.) and complex (fuzzy inference systems, neural networks, etc.) relationships from data. The assumption of the existence of a threshold that accurately predicts device failure is not so easily reconciled. While the existence of a failure threshold has been shown to be valid for well understood degradation processes (e.g. seeded crack growth) and controlled testing environments (e.g. constant load or uniform cycling), there has been an observation that for "real world" applications, where the failure modes are not always well understood or can be too complex to be quantified by a single threshold, the failure boundary is vague at best. One attempt to address this problem is by integrating uncertainty into the estimate of the threshold, but in the end an estimate of the threshold was replaced by another, more conservative estimate. For the nonparametric fuzzy inference system and method 10, instead of saying that an asset has failed if its degradation signal exceeds its threshold, an asset is interpreted as having failed if it in fact fails. Before continuing, it is important to note that if the failure thresholds are well established, the data can be formatted such that the instant where the signal crosses the threshold is interpreted as a failure event.

The path classification and estimation (PACE) procedure 60 is fundamentally composed of two operations: 1) classify a current degradation path as belonging to one or more of previously collected exemplar degradation paths and 2) use the resulting memberships to estimate the RUL. Hence, the name path classification (classify path according to exemplar paths) and estimation (estimate the RUL from the results of the classification). At this point, the path classification and estimation (PACE) procedure 60 will be described in more detail by considering a hypothetical example.

Figure 24A:
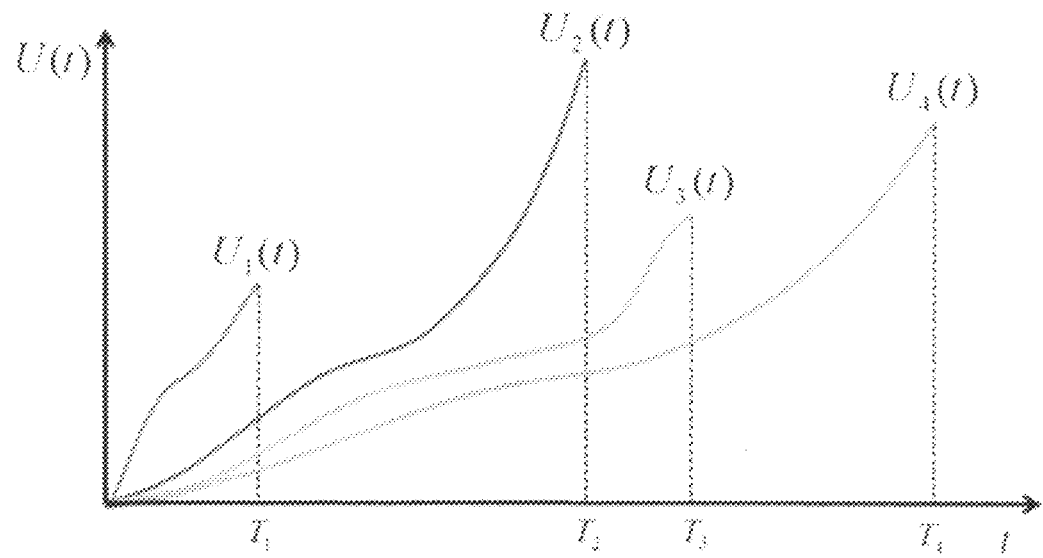
FIG. 24A illustrates a plot of example degradation signals of exemplar assets.
Figure 24B:
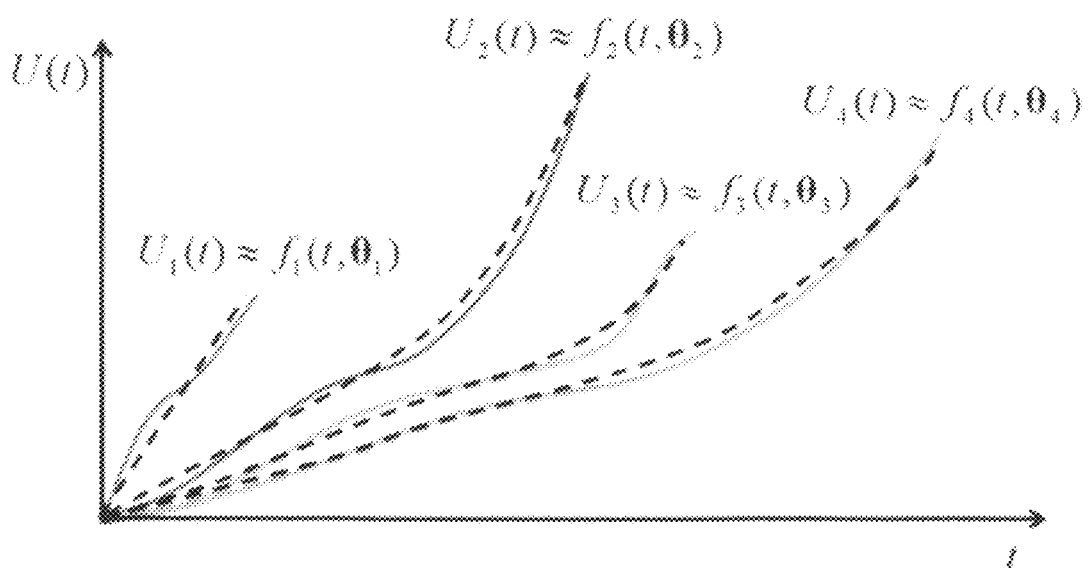
FIG. 24B illustrates a plot of the example degradation signals of exemplar assets illustrated in FIG. 24A and their associated functional approximations shown by dashed lines.

To begin, consider the example degradation signals illustrated in FIGS. 24A and 24B. The degradation signals $U_1(t)$, $U_2(t)$, $U_3(t)$, and $U_4(t)$ and their associated failure times $T_1$, $T_2$, $T_3$, and $T_4$ are illustrated in the FIG. 24A. Here, the failure times are set to be either the time that the asset fails or the time at which someone determines that the asset performance has sufficiently degraded such that it has effectively failed. For this example, it can be seen that there is not a clear failure threshold for the degradation signal. In FIG. 24B, the paths are generalized by fitting an arbitrary function to the data via regression, machine learning, et cetera, for obtaining functional approximations $f_1(t,\theta_1)$, $f_2(t,\theta_2)$, $f_3(t,\theta_3)$, and $f_4(t,\theta_4)$. There are two useful items of information that are extracted from the degradation paths, specifically the failure times and the shape of the degradation that is described by the functional approximations. These items of information are used to construct a vector of exemplar failure times and functional approximations or example asset degradation paths, as follows:

$$T = \begin{bmatrix} T_1 \\ T_2 \\ T_3 \\ T_4 \end{bmatrix} \quad f(t, \Theta) = \begin{bmatrix} f_1(t, \theta_1) \\ f_2(t, \theta_2) \\ f_3(t, \theta_3) \\ f_4(t, \theta_4) \end{bmatrix} \tag{E12}$$

Here, $T_i$ and $f_i(t,\theta_i)$ are the failure times and functional approximation of the $i^{th}$ exemplar degradation signal path, $\theta_i$ are the parameters of the $i^{th}$ functional approximation of the $i^{th}$ exemplar degradation signal path, and $\Theta$ are all of the parameters of each functional approximation.

Figure 25:
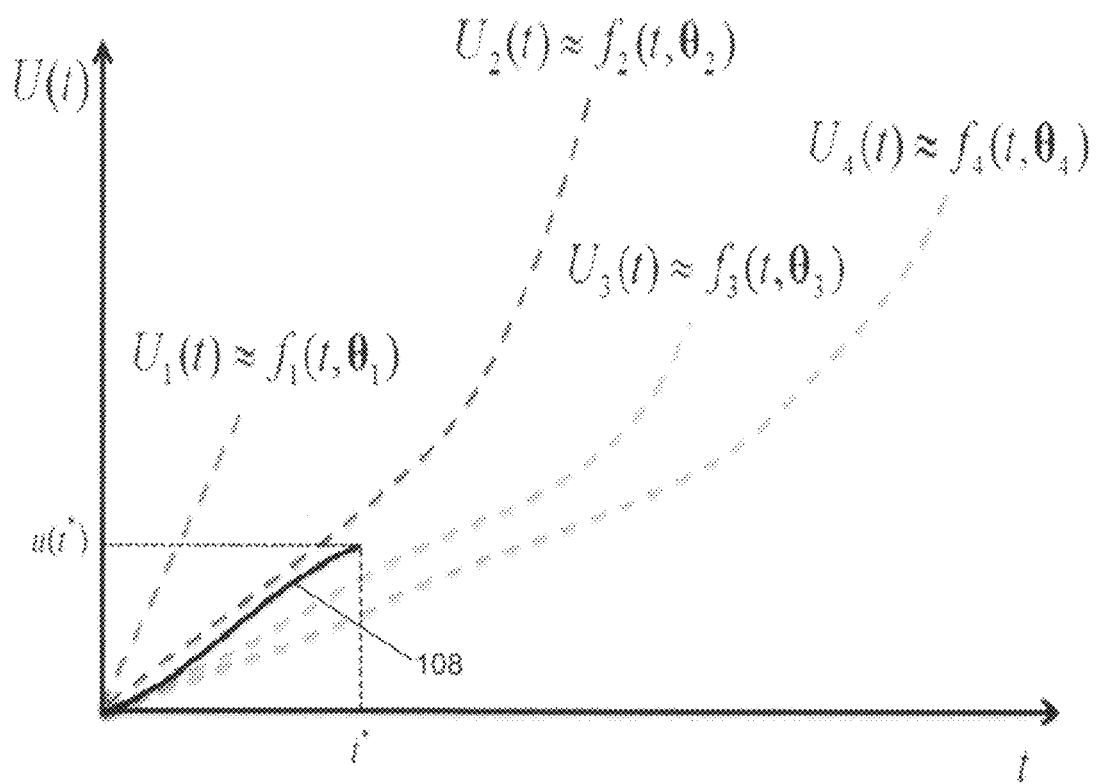
FIG. 25 illustrates a plot of an observation of a degradation signal of an asset at time t* relative to functional approximations of exemplar assets shown by dashed lines.

At this point, suppose that the degradation signal or data of another similar device is being monitored and an estimate of the RUL of the individual device is needed at an arbitrary time $t^*$. Such a case is presented in FIG. 25, where the degradation signal or data 108 is plotted as a solid path. The query observation of the degradation signal or data at time $t^*$ is written as $u(t^*)$. The general process for estimating the RUL can be seen to be composed of three steps. First, the expected degradation signal or data values according to the exemplar degradation paths are estimated by evaluating the regressed functions at $t^*$. At the same time, the expected RULs are calculated by subtracting the current time $t^*$ from the observed failure times of the exemplar paths. Second, the observed degradation signal or data $u(t^*)$ is then classified according to the vector of expected degradation signal or data values $U(t^*)$ to obtain a vector of memberships. Third, the vector of memberships of the observed degradation value to the exemplar degradation paths is combined with the vector of expected RULs to estimate the RUL of the individual device. The details of the path classification and estimation (PACE) procedure 60 will now be described in the context of the present example and FIG. 26.

First, the current use time 110 or current time $t^*$ is used to estimate the expected values of the degradation data 116 according to the exemplar paths 112 and the RULs 122 according to the exemplar failure times 118. In equation form, the expected values of the degradation data according to the exemplar paths are simply the approximating functions 114 evaluated at the current time $t^*$.

$$f(t^*, \Theta) = \begin{bmatrix} f_1(t^*, \theta_1) \\ f_2(t^*, \theta_2) \\ f_3(t^*, \theta_3) \\ f_4(t^*, \theta_4) \end{bmatrix} \tag{E13}$$

The function evaluations can be interpreted as exemplars of the degradation signal or data at time $t^*$. In this context, the above vector can be rewritten as a follows:

$$U(t^*) = \begin{bmatrix} f_1(t^*, \theta_1) \\ f_2(t^*, \theta_2) \\ f_3(t^*, \theta_3) \\ f_4(t^*, \theta_4) \end{bmatrix} = \begin{bmatrix} U_1(t^*) \\ U_2(t^*) \\ U_3(t^*) \\ U_4(t^*) \end{bmatrix} \tag{E14}$$

At the same time, the current time $t^*$ is used with the vector of failure times 118 by subtraction 120 to calculate the expected RULs 122 according to the exemplar degradation paths.

$$L(t^*) = T - t^* = \begin{bmatrix} T_1 - t^* \\ T_2 - t^* \\ T_3 - t^* \\ T_4 - t^* \end{bmatrix} \tag{E15}$$

Now the currently observed degradation signal or data value 124 or $u(t^*)$ can be compared to the expected degradation signal or data values $U(t^*)$ by any one of a number of classification methods 126 (e.g., clustering, nearest neighbor, k-nearest neighbor, non-parametric regression, fuzzy logic, neural networks, et cetera) to obtain a vector of memberships 128 or $\mu_U[u(t^*)]$. Here $\mu_{U_i}[u(t^*)]$ denotes the membership of $u(t^*)$ to the $i^{th}$ exemplar path.

$$\mu_U[u(t^*)] = \begin{bmatrix} \mu_{U_1}[u(t^*)] \\ \mu_{U_2}[u(t^*)] \\ \mu_{U_3}[u(t^*)] \\ \mu_{U_4}[u(t^*)] \end{bmatrix} \tag{E16}$$

Finally, the above memberships and the expected remaining useful lives are combined to estimate the current remaining useful life RUL 130 or $l(t^*)$ of the individual asset. For example, a simple weighted average could be used. To construct the simple weighted average, the memberships could be calculated to have values on $[0,1]$ or scalar values between 0 and 1 with the sum of the memberships normalized to a value of 1. The weighted average remaining useful life is then given by the following:

$$l(t^*) = \sum_{i}^{n} (\mu_{U_i}[u(t^*)] \cdot L_i(t^*)) \tag{E17}$$

Other combination methods include: selecting the example RUL that has the highest membership, setting the RUL to be an average of the k largest memberships, using statistical and/or machine learning (i.e. neural networks, fuzzy logic, et cetera) to infer the RUL from the memberships and other factors such as environmental signals, quality factors for each example path (better examples have larger quality factors), or combining a weighted average with an example selector that is affected by the operating conditions. For example, it is possible that the prognoser would only use examples 1, 3, and 10 for one operating condition and examples 2, 4, and 12 for a different operating condition.

Figure 26:
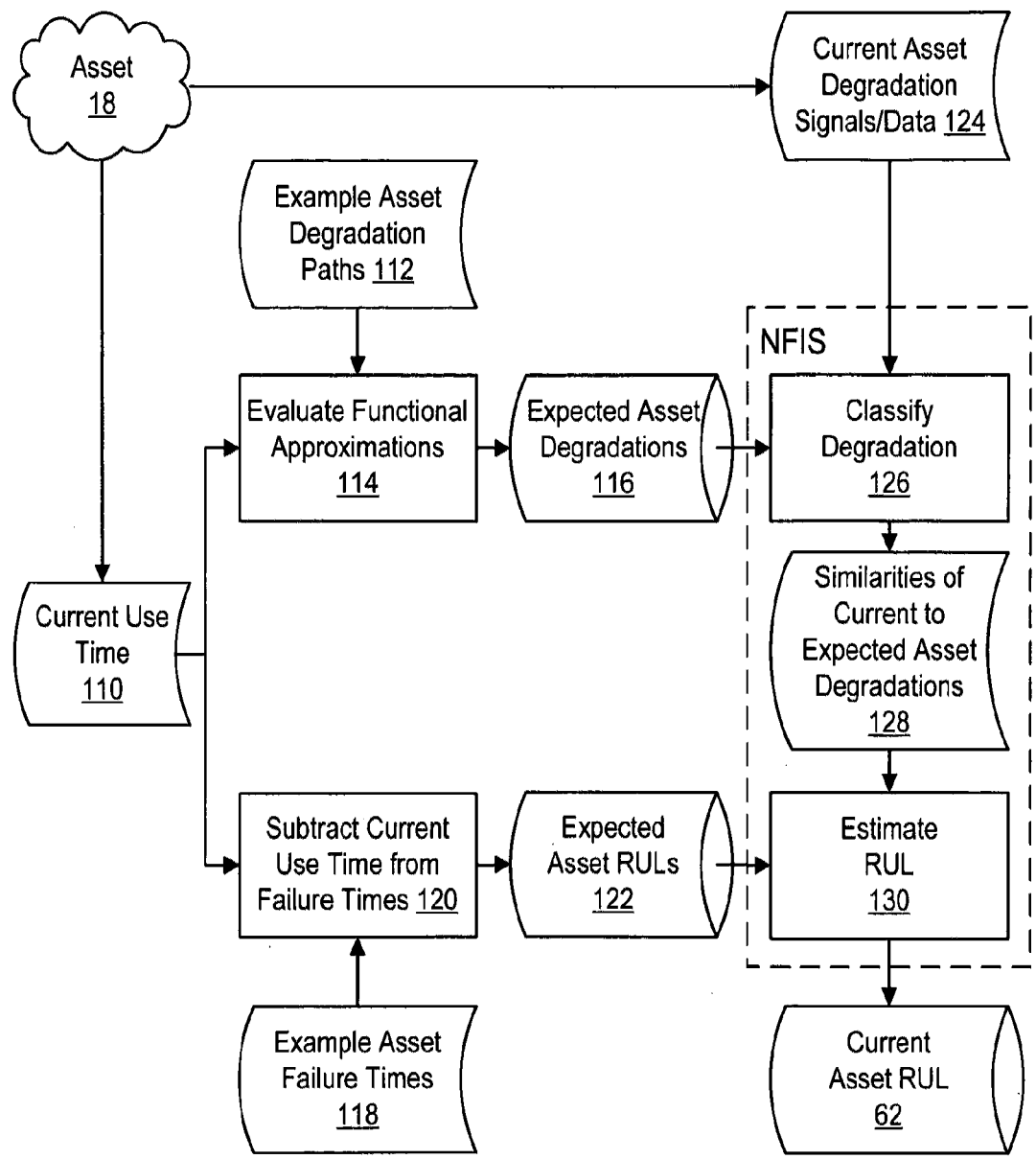
FIG. 26 is a functional flow diagram of an embodiment of the nonparametric fuzzy inference system and method implementation of an embodiment of a path classification and estimation (PACE) procedure or prognoser.

For the presented exemplary application, the nonparametric fuzzy inference system and method 10 was used to perform both the classification and the estimation operations of the path classification and estimation (PACE) procedure 60. If the classifier is structured such that the resulting memberships are simply the DOFs of a series of fuzzy IF rules, then the classifier module of the path classification and estimation (PACE) procedure 60 can be defined as being the antecedent portion of the nonparametric fuzzy inference system and method 10. Similarly, if the estimation module is structured as a series of fuzzy THEN rules, then the estimation module of the path classification and estimation (PACE) procedure 60 can be defined as being the consequent portion of the nonparametric fuzzy inference system and method 10. In this context, the path classification and estimation (PACE) procedure 60 implementing the nonparametric fuzzy inference system and method 10 as illustrated in FIG. 26 is obtained.

Accordingly, and in one aspect, FIG. 27 illustrates a general flowchart view of an embodiment of a computer implemented method for determining an indicator correlative to a condition of an asset. Additionally, an embodiment of the invention provides a computer-readable medium 64 having computer executable instructions recorded thereon which causes, in use, the computer 12 running the instructions to generally execute a procedure according to the computer-implemented method illustrated in FIG. 27.

Accordingly, and in another aspect, FIG. 28 illustrates a flowchart view further detailing an embodiment of a computer implemented method for determining an indicator correlative to a condition of an asset. Additionally, an embodiment of the invention provides a computer-readable medium 64 having computer executable instructions recorded thereon which causes, in use, the computer 12 running the instructions to generally execute a procedure according to the computer-implemented method illustrated in FIG. 28.

Moreover, it should be apparent that further numerous structural modifications and adaptations may be resorted to without departing from the scope and fair meaning of the present invention as set forth hereinabove and as described herein below by the claims.

I claim:

1. A computer implemented method for determining an indicator correlative to a condition of an asset comprising the steps of:
obtaining data correlative to operation of an asset wherein the obtained data is comprised of exemplar observations;
creating membership functions directly from the obtained data by centering each of the membership functions on a different exemplar observation of the obtained data for obtaining the membership functions having membership function centers that are the exemplar observations and introducing an overlap parameter for controlling an extent by which the membership functions overlap each other;
acquiring current asset data from the asset; and
utilizing the membership functions and the current asset data for evaluating antecedents and consequents of conditionals for determining an indicator correlative to a condition of the asset.

2. The computer-implemented method of claim 1 wherein the conditionals are compound IF-THEN logic statements.

3. The computer-implemented method of claim 1 further comprising a step of communicating the determined indicator to a remote computer.

4. The computer-implemented method of claim 1 further comprising a step of displaying the determined indicator on a display.

5. The computer-implemented method of claim 1 further comprising a step of effecting a control action of the asset as a function of the determined indicator.

6. The computer-implemented method of claim 1 further comprising a step effecting an alarm action as a function of the determined indicator.

7. The computer-implemented method of claim 1 further including a step of determining a remaining useful life of the asset from the determined indicator.

8. A computer implemented method for determining an indicator of asset condition, comprising the steps of:
obtaining data correlative to operation of an asset wherein the obtained data is comprised of exemplar observations;
creating input membership functions and output membership functions directly from the obtained data by centering each of the input membership functions and output membership functions on a different exemplar observation of the obtained data for obtaining the input membership functions and the output membership functions having membership function centers that are the exemplar observations and introducing a first overlap parameter for controlling an extent by which the input membership functions overlap each other;
acquiring current asset data from the asset;
utilizing the input membership functions and the current asset data for evaluating antecedents of conditionals and degree of fulfillments of the antecedents;
utilizing the output membership functions and the degree of fulfillments of the antecedents for evaluating consequents of the conditionals; and
utilizing the consequents of the conditionals for determining an indicator of asset condition.

9. The computer-implemented method of claim 8 wherein the conditionals are compound IF-THEN logic statements.

10. The computer-implemented method of claim 8 wherein the step of creating the input membership functions and the output membership functions directly from the obtained data comprises introducing a second overlap parameter for controlling an extent by which the output membership functions overlap each other.

11. The computer-implemented method of claim 8 further comprising a step of communicating the determined indicator to a remote computer.

12. The computer-implemented method of claim 8 further comprising a step of displaying the determined indicator on a display.

13. The computer-implemented method of claim 8 further comprising a step of effecting a control action of the asset as a function of the determined indicator.

14. The computer-implemented method of claim 8 further comprising a step effecting an alarm action as a function of the determined indicator.

15. The method of claim 8 further comprising a step of determining a remaining useful life of the asset from the determined indicator.

16. A nonparametric fuzzy inference system for providing an indicator of asset condition, said system comprising:
means for obtaining data correlative to operation of an asset wherein the obtained data is comprised of exemplar observations;
means for creating membership functions directly from the obtained data by centering each of the membership functions on a different exemplar observation of the obtained data for obtaining the membership functions having membership function centers that are the exemplar observations and introducing an overlap parameter for controlling an extent by which the membership functions overlap each other;
a data acquisition device for acquiring current asset data from the asset; and
means for utilizing said membership functions having said membership function centers that are the exemplar observations and said current asset data for evaluating antecedents and consequents of conditionals for determining an indicator correlative to a condition of the asset.

17. The system of claim 16 wherein said conditionals are compound IF-THEN logic statements.

18. The system of claim 16 further comprising means for communicating said determined indicator to a remote computer.

19. The system of claim 16 further comprising means for displaying said determined indicator on a display.

20. The system of claim 16 further comprising means for effecting a control action of the asset as a function of said determined indicator.

21. The system of claim 16 further comprising means for effecting an alarm action as a function of said determined indicator.

22. The system of claim 16 further comprising means for determining a remaining useful life of the asset from the determined indicator.

23. A nonparametric fuzzy inference system for providing an indicator of asset condition, said system comprising
means for obtaining data correlative to operation of an asset wherein the obtained data is comprised of exemplar observations;
means for creating input membership functions and output membership functions directly from the obtained data by centering each of the input membership functions and output membership functions on a different exemplar observation of the obtained data for obtaining the input membership functions and the output membership functions having membership function centers that are the exemplar observations and introducing a first overlap parameter for controlling an extent by which the input membership functions overlap each other;
a data acquisition device for acquiring current asset data from the asset;
means for utilizing said input membership functions and said current asset data for evaluating antecedents of conditionals and degree of fulfillments of said antecedents;
means for utilizing said output membership functions and said degree of fulfillments of said antecedents for evaluating consequents of said conditionals; and
means for utilizing said consequents of said conditionals for determining an indicator of asset condition.

24. The system of claim 23 wherein said conditionals are compound IF-THEN logic statements.

25. The system of claim 23 wherein said means for creating input membership functions and the output membership functions directly from the obtained data comprises means for introducing a second overlap parameter for controlling an extent by which the output membership functions overlap each other.

26. The system of claim 23 further comprising means for communicating said determined indicator to a remote computer.

27. The system of claim 23 further comprising means for displaying said determined indicator on a display.

28. The system of claim 23 further comprising means for effecting a control action of the asset as a function of said determined indicator.

29. The system of claim 23 thither comprising means for effecting an alarm action as a function of said determined indicator.

30. The system of claim 23 further comprising means for determining a remaining useful life of the asset from said determined indicator.

31. A non-transitory computer-readable medium having computer executable instructions for performing a method for determining an indicator correlative to a condition of an asset, the method comprising the steps of:
obtaining data correlative to operation of an asset wherein the obtained data is comprised of exemplar observations;
creating membership functions directly from the obtained data by centering each of the membership functions on a different exemplar observation of the obtained data for obtaining the membership functions having membership function centers that are the exemplar observations and introducing an overlap parameter for controlling an extent by which the membership functions overlap each other;
acquiring current asset data from the asset; and
utilizing said membership functions having said membership function centers that are the exemplar observations and the current asset data for evaluating antecedents and consequents of conditionals for determining an indicator correlative to a condition of the asset.

32. The non-transitory computer-readable medium of claim 31 wherein the conditionals are compound IF-THEN logic statements.

33. The non-transitory computer-readable medium of claim 31 further comprising a step of communicating the determined indicator to a remote computer.

34. The non-transitory computer-readable medium of claim 31 further comprising a step of displaying the determined indicator on a display.

35. The non-transitory computer-readable medium of claim 31 further comprising a step of effecting a control action of the asset as a function of the determined indicator.

36. The non-transitory computer-readable medium of claim 31 further comprising a step effecting an alarm action as a function of the determined indicator.

37. The non-transitory computer-readable medium of claim 31 further comprising a step of determining a remaining useful life of the asset from the determined indicator.

38. A non-transitory computer-readable medium having computer executable instructions for performing a method for determining an indicator correlative to a condition of an asset, the method comprising the steps of:
obtaining data correlative to operation of an asset wherein the obtained data is comprised of exemplar observations;
creating input membership functions and output membership functions directly from the obtained data by centering each of the input membership functions and output membership functions on a different exemplar observation of the obtained data for obtaining the input membership functions and the output membership functions having membership function centers that are the exemplar observations and introducing a first overlap parameter for controlling an extent by which the input membership functions overlap each other;

acquiring current asset data from the asset;

utilizing the input membership functions and the current asset data for evaluating antecedents of conditionals and degree of fulfillments of the antecedents;

utilizing the output membership functions and the degree of fulfillments of the antecedents for evaluating consequents of the conditionals; and utilizing the consequents of the conditionals for determining an indicator of asset condition.

39. The non-transitory computer-readable medium of claim 38 wherein the conditionals are compound IF-THEN logic statements.

40. The non-transitory computer-readable medium of claim 38 wherein the step of creating the input membership functions and the output membership functions directly from the obtained data comprises introducing a second overlap parameter for controlling an extent by which the output membership functions overlap each other.

41. The non-transitory computer-readable medium of claim 38 further comprising a step of communicating the determined indicator to a remote computer.

42. The non-transitory computer-readable medium of claim 38 further comprising a step of displaying the determined indicator on a display.

43. The non-transitory computer-readable medium of claim 38 further comprising a step of effecting a control action of the asset as a function of the determined indicator.

44. The non-transitory computer-readable medium of claim 38 further comprising a step effecting an alarm action as a function of the determined indicator.

45. The non-transitory computer-readable medium of claim 38 further comprising a step of determining a remaining useful life of the asset from the determined indicator.

* * * * *